US012643124B2

(12) United States Patent
Tsuruda et al.

(10) Patent No.: US 12,643,124 B2
(45) Date of Patent: Jun. 2, 2026

(54) CONTROL PARAMETER SETTING METHOD, SUBSTRATE PROCESSING APPARATUS, AND STORAGE MEDIUM

(71) Applicant: Tokyo Electron Limited, Tokyo (JP)

(72) Inventors: Toyohisa Tsuruda, Koshi City (JP); Kazuhiro Shiba, Kikuchi-gun (JP); Naoto Nakamura, Koshi City (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 527 days.

(21) Appl. No.: 17/979,338

(22) Filed: Nov. 2, 2022

(65) Prior Publication Data

US 2023/0149973 A1 May 18, 2023

(30) Foreign Application Priority Data

Nov. 12, 2021 (JP) ................................ 2021-184554

(51) Int. Cl.
*B05D 1/00* (2006.01)
*B05C 5/02* (2006.01)

(52) U.S. Cl.
CPC ............ *B05D 1/002* (2013.01); *B05C 5/0225* (2013.01)

(58) Field of Classification Search
None
See application file for complete search history.

(56) References Cited

U.S. PATENT DOCUMENTS 5,924,058 A * 7/1999 Waldhauer .............. H01L 22/34 702/170
2008/0233269 A1 9/2008 Carcasi et al.
2011/0272275 A1* 11/2011 Kang ...................... H01J 37/34 204/192.1
2013/0260046 A1* 10/2013 Komatsubara ...... B05C 11/1013 118/712
2019/0355573 A1* 11/2019 Shimura ........... H01L 21/67253
(Continued)

FOREIGN PATENT DOCUMENTS

JP 2003158056 A * 5/2003
JP 2014099437 A * 5/2014
JP 2017028086 A * 2/2017
(Continued)

*Primary Examiner* — David Earl Ogg
(74) *Attorney, Agent, or Firm* — Nath, Goldberg & Meyer; Jerald L. Meyer; Tanya E. Harkins

(57) ABSTRACT

A control parameter setting method for setting control parameters of film forming modules included, includes: acquiring a first parameter group including control parameters for controlling a film forming process in a first film forming module, and a second parameter group including control parameters for controlling a film forming process in a second film forming module; acquiring a film thickness value of a processed film on a substrate subjected to film formation by the first film forming module based on the first parameter group, and a film thickness value of a processed film on a substrate subjected to film formation by the second film forming module based on the second parameter group; and updating the first parameter group and the second parameter group so that a difference between the film thickness values acquired in the first film forming module and the second film forming module is reduced.

18 Claims, 19 Drawing Sheets

(56) References Cited

U.S. PATENT DOCUMENTS

2022/0119336 A1 * 4/2022 Omatsu ................. G03F 7/2004

FOREIGN PATENT DOCUMENTS

| | | | | |
|---|---|---|---|---|
| JP | 2018-537853 | A | | 12/2018 |
| JP | 2021-052093 | A | | 4/2021 |
| KR | 20160100234 | A | * | 8/2016 |
| WO | 2021/145175 | A1 | | 7/2021 |

* cited by examiner

FIG. 9A

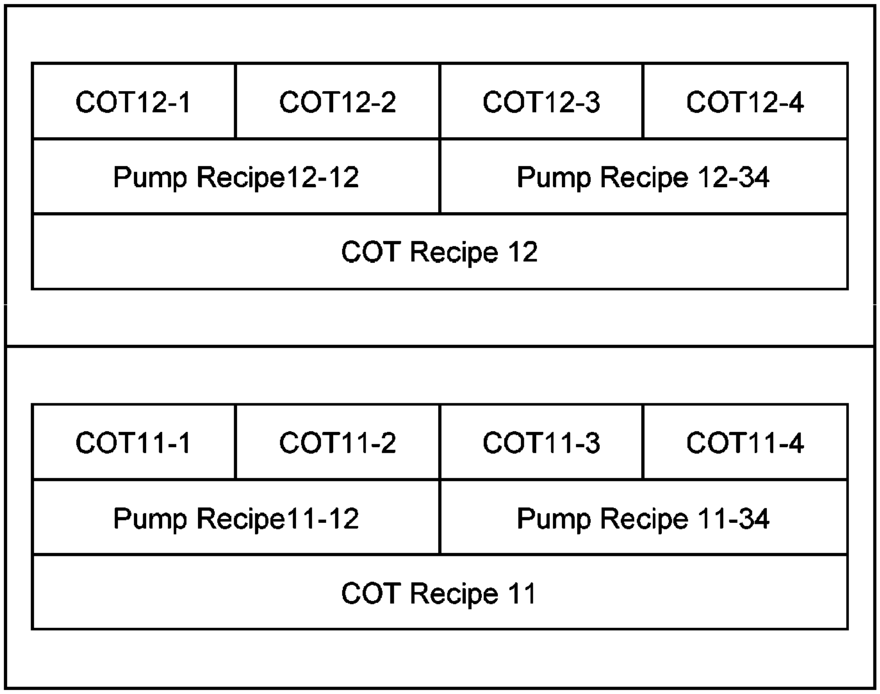

FIG. 9B $$\text{FT} = \text{Total average} + \begin{bmatrix} \text{COT11} - 1 \\ \vdots \\ \text{COT12} - 4 \end{bmatrix} + \text{Error}$$

$$\text{Total average} + \begin{bmatrix} \text{11th floor component} + \begin{bmatrix} \text{Pump}_{111}\ \text{Component} \\ \text{Pump}_{113}\ \text{Component} \end{bmatrix} \\ \\ \text{12th floor component} + \begin{bmatrix} \text{Pump}_{121}\ \text{Component} \\ \text{Pump}_{123}\ \text{Component} \end{bmatrix} \end{bmatrix} + \text{Error}$$

$$\text{11th floor component} + \text{12th floor component} = 0$$

$$\text{Pump}_{111}\ \text{Component} + \text{Pump}_{113}\ \text{Component} = 0$$

$$\text{Pump}_{121}\ \text{Component} + \text{Pump}_{123}\ \text{Component} = 0$$

CONTROL PARAMETER SETTING METHOD, SUBSTRATE PROCESSING APPARATUS, AND STORAGE MEDIUM

CROSS-REFERENCE TO RELATED APPLICATION

This application is based upon and claims the benefit of priority from Japanese Patent Application No. 2021-184554, filed on Nov. 12, 2021, the entire contents of which are incorporated herein by reference.

TECHNICAL FIELD

The present disclosure relates to a control parameter setting method, a substrate processing apparatus, and a storage medium.

BACKGROUND

In Patent Document 1, based on the measurement data such as a resist film thickness and the like in a main pattern forming apparatus, a correction amount related to pattern formation in the main pattern forming apparatus is determined, and a correction amount in a pattern forming apparatus different from the main pattern forming apparatus is also determined.

PRIOR ART DOCUMENTS

Patent Documents

Patent Document 1: Japanese Laid-Open Publication No. 2003-158056

SUMMARY

According to one embodiment of the present disclosure, there is provided a control parameter setting method for setting control parameters of film forming modules included in a substrate processing apparatus, including: acquiring a first parameter group which is a control parameter group including control parameters for controlling a film forming process in a first film forming module, and a second parameter group which is a control parameter group including control parameters for controlling a film forming process in a second film forming module; acquiring a film thickness value of a processed film on a substrate subjected to film formation by the first film forming module based on the first parameter group, and a film thickness value of a processed film on a substrate subjected to film formation by the second film forming module based on the second parameter group; and updating the first parameter group and the second parameter group so that a difference between the film thickness value on the substrate acquired in the first film forming module and the film thickness value on the substrate acquired in the second film forming module is reduced.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIGS. 9A and 9B are diagrams showing an example of a control parameter correction value calculation method.

DETAILED DESCRIPTION

Figure 1:
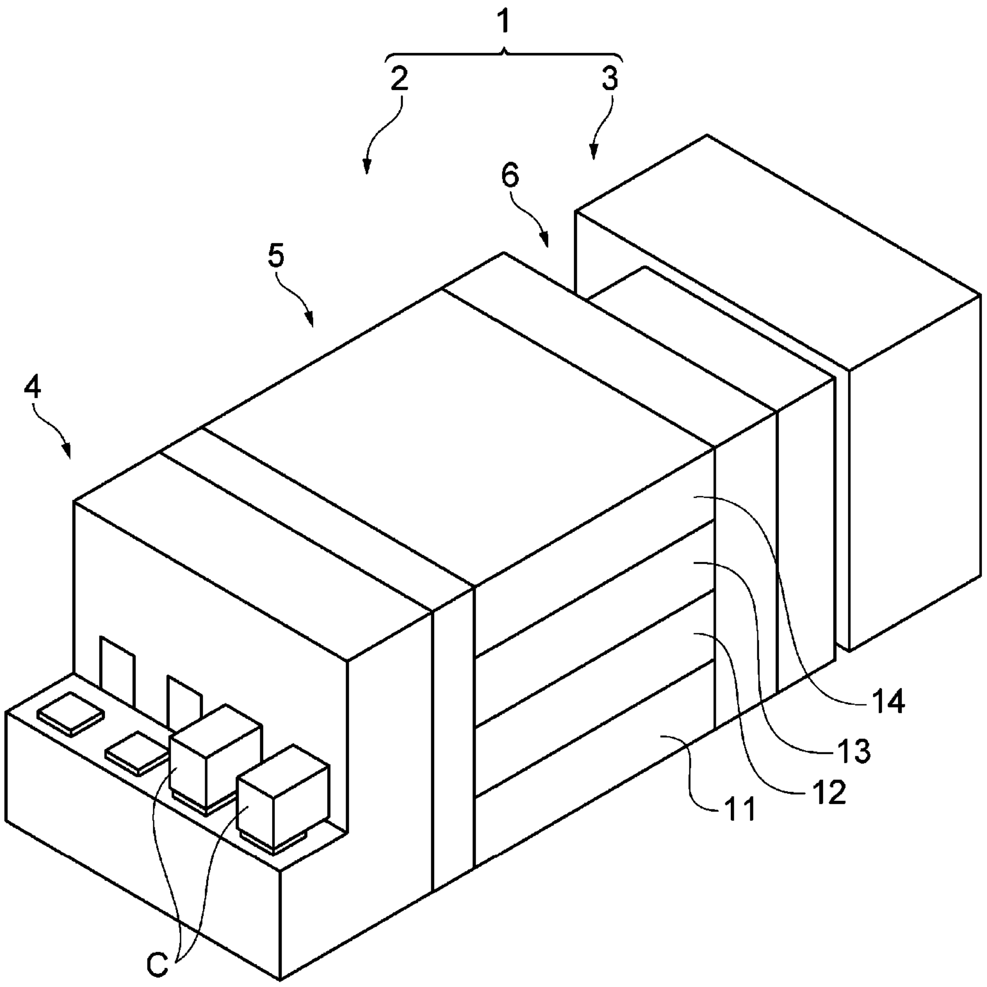
FIG. 1 is a schematic diagram showing an example of a substrate processing system.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

In one exemplary embodiment, there is provided a control parameter setting method for setting control parameters of film forming modules included in a substrate processing apparatus, comprising: acquiring a first parameter group which is a control parameter group including control parameters for controlling a film forming process in a first film forming module, and a second parameter group which is a control parameter group including control parameters for controlling a film forming process in a second film forming module; acquiring a film thickness value of a processed film on a substrate subjected to film formation by the first film forming module based on the first parameter group, and a film thickness value of a processed film on a substrate subjected to film formation by the second film forming module based on the second parameter group; and updating the first parameter group and the second parameter group so that a difference between the film thickness value on the substrate acquired in the first film forming module and the film thickness value on the substrate acquired in the second film forming module is reduced.

According to the above control parameter setting method, the film thickness value of the processed film on the substrate subjected to film formation in the first film forming module is acquired based on the first parameter group, and the film thickness value of the processed film on the substrate subjected to film formation in the second film forming module is acquired based on the second parameter group. The first parameter group and the second parameter group are updated so that the difference between the film thickness values is reduced. Therefore, the difference in film thickness between the films formed on the substrates in different modules is reduced.

The method may further comprise acquiring the film thickness value of the processed film on the substrate subjected to film formation by the first film forming module based on the updated first parameter group and the film thickness value of the processed film on the substrate subjected to film formation by the second film forming module based on the updated second parameter group.

By acquiring the film thickness values of the processed films on the substrates subjected to film formation using the updated first parameter group and the updated second parameter group as described above, it is possible to verify whether the difference in film thickness value is reduced based on the updated first parameter group and the second parameter group. Therefore, if the difference in film thickness value is not reduced, it is possible to update the first parameter group and the second parameter group again. Accordingly, the difference in film thickness value between the films formed on the substrates in different modules is further reduced.

The film forming module may include a rotary holder configured to hold and rotate the substrate and a processing liquid supplier configured to supply a processing liquid to the rotated substrate. The first parameter group and the second parameter group may include at least a parameter for adjusting an injection state from the processing liquid supplier.

When the film forming module includes the processing liquid supplier, the injection state of the processing liquid injected from the processing liquid supplier may affect the film thickness value. Therefore, by using the parameter for adjusting the injection state of the processing liquid as the control parameter, it is possible to adjust the injection state of the processing liquid so as to reduce the difference in film thickness value.

The processing liquid supplier may include a valve configured to control the flow of the processing liquid in a processing liquid flow path by opening/closing operations, and the parameter for adjusting the injection state is a closing timing of the valve.

If the film forming module includes the processing liquid supplier, the flow of processing liquid through the valve may affect the film thickness value. Therefore, by using the closing timing of the valve as the parameter for adjusting the injection state of the processing liquid, it is possible to adjust the injection state of the processing liquid so as to reduce the difference in film thickness value.

The processing liquid supplier may be configured to change the injection pressure of the processing liquid and configured to update the injection pressure, when the close timing of the valve included in the first parameter group or the second parameter group is updated, based on the updated closing timing so that the amount of the processing liquid supplied from the processing liquid supplier becomes constant.

Changing the closing timing of the valve affects the amount of supply of the processing liquid. However, if the amount of supply of the processing liquid is changed, the film thickness value may be changed significantly from a predetermined value. Therefore, by updating the injection pressure so that the amount of supply of the processing liquid from the processing liquid supplier becomes constant based on the changed closing timing as described above, it is possible to suppress the variation in film thickness due to the change of the amount of supply of the processing liquid.

The control parameter group may include the number of rotations of the rotary holder when supplying the processing liquid, or the number of rotations of the rotary holder when drying the supplied processing liquid.

When the film forming module includes the rotary holder, the number of rotations of the rotary holder when supplying the processing liquid and the number of rotations of the rotary holder when drying the processing liquid may affect the film thickness value. Therefore, by using the number of rotations of the rotary holder during the supply of the processing liquid or the number of rotations of the rotary holder during drying as a control parameter, it is possible to make adjustment so as to reduce the difference in film thickness value.

The film thickness value may be expressed as a film thickness profile including components related to a film thickness distribution shape, the method may further comprise determining the sensitivity of the control parameters included in the first parameter group and the second parameter group related to the film thickness value based on a relationship with each of the components included in the film thickness profile, and when updating the first parameter group and the second parameter group, each of the control parameters included in the first parameter group and the second parameter group is updated by using the sensitivity of the control parameters related to the film thickness value.

With the above configuration, by expressing the film thickness value as the film thickness profile including the components related to the film thickness distribution shape, it is possible to identify which of the element related to the film thickness distribution is included in the film thickness value. In addition, by calculating the degree to which each of the control parameters included in the parameter groups contributes to the variation of the film thickness value as the sensitivity to the film thickness value, it is possible to accurately update the control parameters so that the difference in film thickness value becomes small.

The method may further comprise transferring information about the sensitivity of the control parameters related to the film thickness value to another substrate processing apparatus different from the substrate processing apparatus.

With such a configuration, the information about the sensitivity of the control parameters to the film thickness value can be used in multiple substrate processing apparatuses, thereby improving the convenience.

The method may further comprise acquiring an offset amount of the film thickness value when acquiring the film thickness value of the processed film in one of the first film forming module and the second film forming module.

When measuring the film thickness of the processed film formed on the substrate, an offset component derived from a measurement device or the like may be included in the film thickness. Therefore, by adopting the configuration that acquires the offset amount, it is possible to obtain the film thickness measurement taking the offset amount into account. By using this information, it is possible to make finer adjustment to reduce the difference in film thickness value, and it is possible to make accurate film thickness adjustment.

The method may further comprise updating the first parameter group and the second parameter group with respect to multiple types of film forming processes, and instructing execution of a film forming process that combines the updated control parameters related to the multiple types of film forming processes obtained for the same film forming module.

With the above configuration, when the same type of film forming process is performed in the same film forming module, the process using the updated control parameters can be performed without performing the process for updating the control parameters again. Therefore, the convenience of film formation is improved.

In one exemplary embodiment, there is provided a substrate processing apparatus comprising: a controller configured to control a first film forming module and a second film forming module that perform a film forming process on a substrate, wherein the controller includes: a parameter acquisitor configured to acquire a first parameter group which is a control parameter group including control parameters for controlling a film forming process in the first film forming module, and a second parameter group which is a control parameter group including control parameters for controlling a film forming process in the second film forming module; a film thickness information acquisitor configured to acquire a film thickness value of a processed film on a substrate subjected to film formation by the first film forming module based on the first parameter group and acquire a film thickness value of a processed film on a substrate subjected to film formation by the second film forming module based on the second parameter group; and a parameter updater configured to update the first parameter group and the second parameter group so that a difference between the film thickness value on the substrate acquired in the first film forming module and the film thickness value on the substrate acquired in the second film forming module is reduced.

According to the above substrate processing apparatus, the film thickness value of the processed film on the substrate subjected to film formation in the first film forming module is acquired based on the first parameter group, and the film thickness value of the processed film on the substrate subjected to film formation in the second film forming module is acquired based on the second parameter group. The first parameter group and the second parameter group are updated so that the difference between the film thickness values is reduced. Therefore, the difference in film thickness between the films formed on the substrates in different modules is reduced.

The film thickness information acquisitor may be configured to acquire the film thickness value of the processed film on the substrate subjected to film formation by the first film forming module based on the updated first parameter group and the film thickness value of the processed film on the substrate subjected to film formation by the second film forming module based on the updated second parameter group.

By acquiring the film thickness values of the processed films on the substrates subjected to film formation using the updated first parameter group and the updated second parameter group as described above, it is possible to verify whether the difference in film thickness value is reduced based on the updated first parameter group and the second parameter group. Therefore, if the difference in film thickness value is not reduced, it is possible to update the first parameter group and the second parameter group again. Accordingly, the difference in film thickness value between the films formed on the substrates in different modules is further reduced.

The film forming module may include a rotary holder configured to hold and rotate the substrate and a processing liquid supplier configured to supply a processing liquid to the rotated substrate, and the first parameter group and the second parameter group may include at least a parameter for adjusting an injection state from the processing liquid supplier.

When the film forming module includes the processing liquid supplier, the injection state of the processing liquid injected from the processing liquid supplier may affect the film thickness value. Therefore, by using the parameter for adjusting the injection state of the processing liquid as the control parameter, it is possible to adjust the injection state of the processing liquid so as to reduce the difference in film thickness value.

The processing liquid supplier may include a valve configured to control the flow of the processing liquid in a processing liquid flow path by opening/closing operations thereof, and the parameter for adjusting the injection state is a closing timing of the valve.

If the film forming module includes the processing liquid supplier, the flow of processing liquid through the valve may affect the film thickness value. Therefore, by using the closing timing of the valve as the parameter for adjusting the injection state of the processing liquid, it is possible to adjust the injection state of the processing liquid so as to reduce the difference in film thickness value.

The processing liquid supplier may be configured to change the injection pressure of the processing liquid and configured to update the injection pressure based on the changed closing timing so that the amount of the processing liquid supplied from the processing liquid supplier becomes constant when the close timing of the valve included in the first parameter group or the second parameter group is updated.

Changing the closing timing of the valve affects the amount of supply of the processing liquid. However, if the amount of supply of the processing liquid is changed, the film thickness value may be changed significantly from a predetermined value. Therefore, by updating the injection pressure so that the amount of supply of the processing liquid from the processing liquid supplier becomes constant based on the changed closing timing as described above, it is possible to suppress the variation in film thickness due to the change of the amount of supply of the processing liquid.

The control parameter group may include the number of rotations of the rotary holder when supplying the processing liquid, or the number of rotations of the rotary holder when drying the supplied processing liquid.

When the film forming module includes the rotary holder, the number of rotations of the rotary holder when supplying the processing liquid and the number of rotations of the rotary holder when drying the processing liquid may affect the film thickness value. Therefore, by using the number of rotations of the rotary holder during the supply of the processing liquid or the number of rotations of the rotary holder during drying as a control parameter, it is possible to make adjustment so as to reduce the difference in film thickness value.

The film thickness value may be expressed as a film thickness profile including components related to a film thickness distribution shape, the controller may further include a parameter sensitivity calculator configured to determine the sensitivity of the control parameters included in the first parameter group and the second parameter group related to the film thickness value based on a relationship with each of the components included in the film thickness profile, and the parameter updater may be configured to update each of the control parameters included in the first parameter group and the second parameter group by using the sensitivity of the control parameters related to the film thickness value.

With the above configuration, by expressing the film thickness value as the film thickness profile including the components related to the film thickness distribution shape, it is possible to identify which of the element related to the film thickness distribution is included in the film thickness value. In addition, by calculating the degree to which each of the control parameters included in the parameter groups contributes to the variation of the film thickness value as the sensitivity to the film thickness value, it is possible to accurately update the control parameters so that the difference in film thickness value becomes small.

The controller may further include an offset amount acquisitor configured to acquire an offset amount of the film thickness value when acquiring the film thickness value of the processed film in the first film forming module or the second film forming module.

When measuring the film thickness of the processed film formed on the substrate, an offset component derived from a measurement device or the like may be included in the film thickness. Therefore, by adopting the configuration that acquires the offset amount, it is possible to obtain the film thickness measurement taking the offset amount into account. By using this information, it is possible to make finer adjustment to reduce the difference in film thickness value, and it is possible to make accurate film thickness adjustment.

The controller may be configured to allow the parameter updater to update the first parameter group and the second parameter group with respect to multiple types of film forming processes, and may further include an instructor configured to instruct execution of a film forming process that combines the updated control parameters related to the multiple types of film forming processes obtained for the same film forming module.

With the above configuration, when the same type of film forming process is performed in the same film forming module, the process using the updated control parameters can be performed without performing the process for updating the control parameters again. Therefore, the convenience of film formation is improved.

In one exemplary embodiment, there is provided a non-transitory computer-readable storage medium storing a program that causes an apparatus to perform the control parameter setting method. The storage medium has the same effects as those obtained in the control parameter setting method.

Various exemplary embodiments will be described in detail below with reference to the drawings. In addition, the same or equivalent parts in each drawing are designated by like reference numerals.

[Substrate Processing System]

A substrate processing system 1 (substrate processing apparatus) shown in FIG. 1 is a system for forming a photosensitive film on a workpiece W, exposing the photosensitive film, and developing the photosensitive film. The workpiece W to be processed is, for example, a substrate, or a substrate on which a film, a circuit, or the like is formed by performing a predetermined process. The substrate is, for example, a silicon wafer. The workpiece W (substrate) may be circular. The workpiece W may be a glass substrate, a mask substrate, an FPD (Flat Panel Display), or the like. The photosensitive film is, for example, a resist film.

Figure 2:
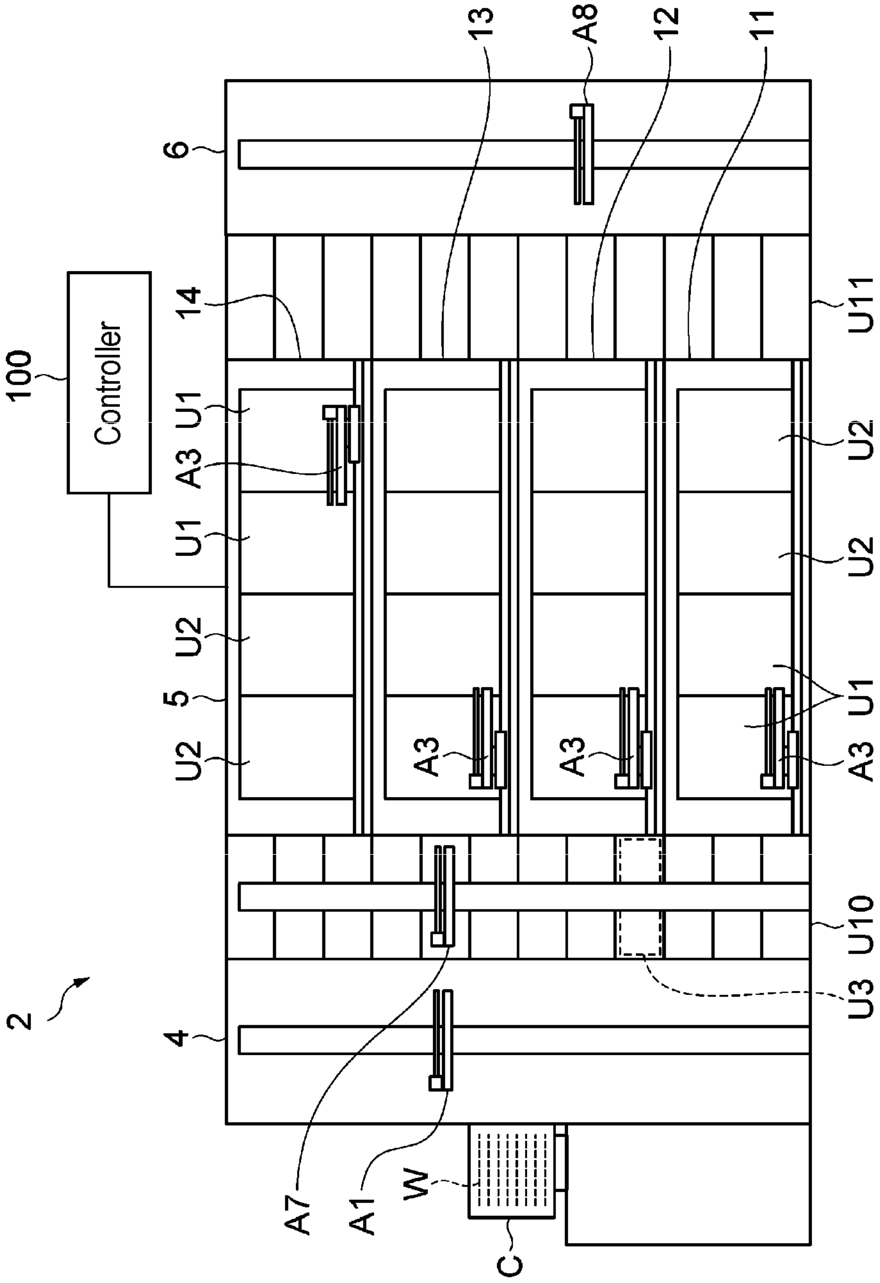
FIG. 2 is a schematic diagram showing an example of a coating developing apparatus.

As shown in FIGS. 1 and 2, the substrate processing system 1 includes a coating developing apparatus 2, an exposure apparatus 3, and a control device 100 (controller). The exposure apparatus 3 is an apparatus that exposes a resist film (photosensitive film) formed on a workpiece W (substrate). Specifically, the exposure apparatus 3 irradiates an exposure target portion of the resist film with an energy beam by a method such as liquid immersion exposure or the like.

The coating developing apparatus 2 coats a resist (chemical solution) on the surface of the workpiece W to form a resist film before an exposure process performed by the exposure apparatus 3, and develops the resist film after the exposure process. The coating developing apparatus 2 includes a carrier block 4, a processing block 5, and an interface block 6.

The carrier block 4 loads the workpiece W into the coating developing apparatus 2, and unloads the workpiece W out of the coating developing apparatus 2. For example, the carrier block 4 can support carriers C for workpieces W, and incorporates a transfer device A1 including a delivery arm. The carrier C accommodates, for example, circular workpieces W. The transport device A1 takes out the workpiece W from the carrier C, delivers the workpiece W to the processing block 5, receives the workpiece W from the processing block 5, and returns the workpiece W to the carrier C. The processing block 5 includes processing modules 11, 12, 13 and 14.

The processing module 11 incorporates a liquid processing unit U1, a heat treatment unit U2, and a transfer device A3 for transferring the workpiece W to the liquid processing unit U1 and the heat treatment unit U2. The processing module 11 forms a lower layer film on the surface of the workpiece W using the liquid processing unit U1 and the heat treatment unit U2. An example of the lower layer film is an SOC (Spin-On-Carbon) film. The liquid processing unit U1 coats the workpiece W with a processing liquid for forming the lower layer film. The heat treatment unit U2 performs various heat treatments associated with the formation of the lower layer film.

The processing module 12 incorporates a liquid processing unit U1, a heat treatment unit U2, and a transfer device A3 for transferring the workpiece W to the liquid processing unit U1 and the heat treatment unit U2. The processing module 12 forms a resist film on a lower layer film by the liquid processing unit U1 and the heat treatment unit U2. The liquid processing unit U1 coats a processing liquid for forming a resist film onto the lower layer film to form a film of the processing liquid on the lower layer film (on the surface of the workpiece W). The heat treatment unit U2 performs various heat treatments associated with the formation of the resist film.

The processing module 13 incorporates a liquid processing unit U1, a heat treatment unit U2, and a transfer device A3 for transferring the workpiece W to the liquid processing unit U1 and the heat treatment unit U2. The processing module 13 forms an upper layer film on the resist film using the liquid processing unit U1 and the heat treatment unit U2. The liquid processing unit U1 coats a processing liquid for forming an upper layer film onto the resist film. The heat treatment unit U2 performs various heat treatments associated with the formation of the upper layer film.

The processing module 14 incorporates a liquid processing unit U1, a heat treatment unit U2, and a transfer device A3 for transferring the workpiece W to the liquid processing unit U1 and the heat treatment unit U2. The processing module 14 uses the liquid processing unit U1 and the heat treatment unit U2 to develop the resist film subjected to the exposure process and to perform a heat treatment associated with the development process. The liquid processing unit U1 coats a developer on the surface of the exposed workpiece W, and then rinses the workpiece W with a rinsing liquid to develop the resist film. The heat treatment unit U2 performs various heat treatments associated with the development process. Specific examples of the heat treatments include a heat treatment before development (PEB: Post Exposure Bake) and a heat treatment after development (PB: Post Bake).

A shelf unit U10 is provided on the side of the carrier block 4 in the processing block 5. The shelf unit U10 is partitioned into vertically arranged cells. A transfer device A7 including an elevating arm is provided in the vicinity of the shelf unit U10. The transfer device A7 raises and lowers the workpiece W between the cells of the shelf unit U10. A measurement unit U3 functioning as a measurement part, which will be described later, is provided in the shelf unit U10. The measurement unit U3 acquires information on the film thickness of the films (the lower layer film, the resist film, the upper layer film, etc.) formed by the liquid processing unit U1 and the heat treatment unit U2. This point will be described later.

A shelf unit U11 is provided on the side of the interface block 6 in the processing block 5. The shelf unit U11 is partitioned into vertically arranged cells.

The interface block 6 delivers the workpiece W to and from the exposure apparatus 3. For example, the interface block 6 incorporates a transfer device A8 including a delivery arm and is connected to the exposure apparatus 3. The transfer device A8 delivers the workpiece W arranged on the shelf unit U11 to the exposure apparatus 3. The transfer device A8 receives the workpiece W from the exposure apparatus 3 and returns the workpiece W to the shelf unit U11.

The control device 100 controls the coating developing apparatus 2 so as to execute, for example, a coating developing process in the following procedure. First, the control device 100 controls the transfer device A1 to transport the workpiece W in the carrier C to the shelf unit U10, and controls the transfer device A7 to arrange the workpiece W in the cell for the processing module 11.

Next, the control device 100 controls the transfer device A3 so as to transfer the workpiece W on the shelf unit U10 to the liquid processing unit U1 and the heat treatment unit U2 in the processing module 11. Further, the control device 100 controls the liquid processing unit U1 and the heat treatment unit U2 so as to form a lower layer film on the surface of the workpiece W. Thereafter, the control device 100 controls the transfer device A3 so as to return the workpiece W on which the lower layer film is formed to the shelf unit U10, and controls the transfer device A7 so as to arrange the workpiece W in the cell for the processing module 12. After the lower layer film is formed, the workpiece W may be transferred to the measurement unit U3 of the shelf unit U10, and the film thickness of the lower layer film formed on the workpiece W may be evaluated.

Next, the control device 100 controls the transfer device A3 so as to transfer the workpiece W on the shelf unit U10 to the liquid processing unit U1 and the heat treatment unit U2 in the processing module 12. Further, the control device 100 controls the liquid processing unit U1 and the heat treatment unit U2 so as to form a resist film on the lower layer film of the workpiece W. Thereafter, the control device 100 controls the transfer device A3 so as to return the workpiece W to the shelf unit U10, and controls the transport device A7 so as to arrange the workpiece W in the cell for the processing module 13. After the resist film is formed, the workpiece W may be transferred to the measurement unit U3 of the shelf unit U10, and the film thickness of the resist film formed on the workpiece W may be evaluated.

Next, the control device 100 controls the transfer device A3 so as to transfer the workpiece W on the shelf unit U10 to each unit in the processing module 13. Further, the control device 100 controls the liquid processing unit U1 and the heat treatment unit U2 so as to form an upper layer film on the resist film of the workpiece W. Thereafter, the control device 100 controls the transfer device A3 so as to transfer the workpiece W to the shelf unit U11. After the upper layer film is formed, the workpiece W may be transferred to the measurement unit U3 of the shelf unit U10, and the film thickness of the upper layer film formed on the workpiece W may be evaluated.

Next, the control device 100 controls the transfer device A8 so as to send out the workpiece W on the shelf unit U11 to the exposure apparatus 3. Thereafter, the control device 100 controls the transfer device A8 so as to receive the workpiece W subjected to the exposure process from the exposure apparatus 3 and arrange the workpiece W in the cell for the processing module 14 in the shelf unit U11.

Next, the control device 100 controls the transfer device A3 so as to transfer the workpiece W on the shelf unit U11 to each unit in the processing module 14, and controls the liquid processing unit U1 and the heat treatment unit U2 so as to develop the resist film of the workpiece W. Thereafter, the control device 100 controls the transfer device A3 so as to return the workpiece W to the shelf unit U10, and controls the transfer devices A7 and A1 so as to return the workpiece W to the carrier C. Thus, the coating developing process for one workpiece W is completed. The control device 100 controls the coating developing apparatus 2 so as to perform a coating developing process on each of the subsequent workpieces W in the same manner as described above.

The specific configuration of the substrate processing apparatus is not limited to the configuration of the substrate processing system 1 illustrated above. The substrate processing apparatus may be of any type as long as it includes a liquid processing unit that supplies a processing liquid to a substrate to perform liquid processing and a control device that can control the liquid processing unit.

(Liquid Processing Unit)

Figure 3:
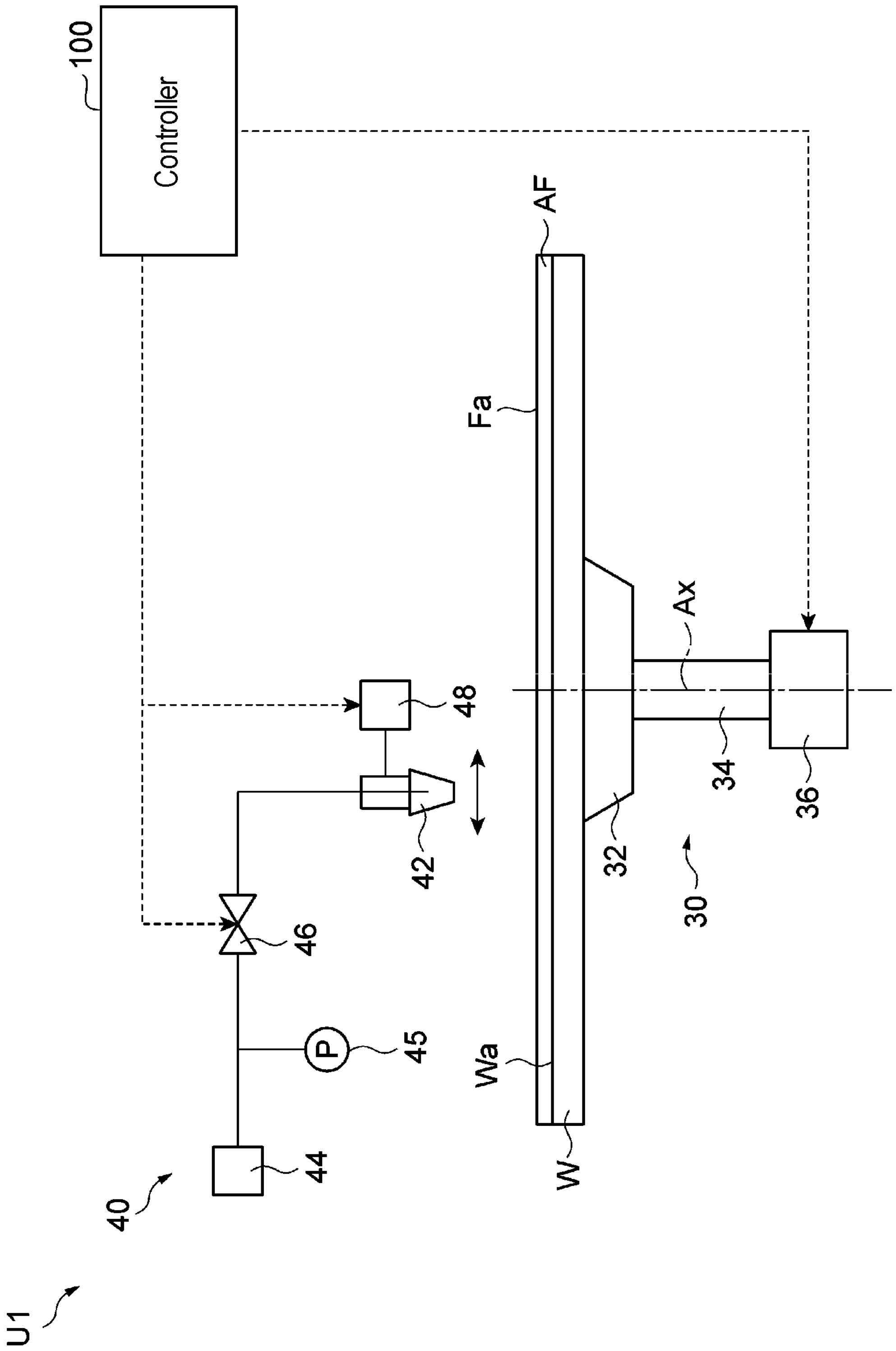
FIG. 3 is a schematic diagram showing an example of a liquid processing unit.

Next, an example of the liquid processing unit U1 of the processing module 12 will be described with reference to FIG. 3. The liquid processing unit U1 (liquid processor) supplies the processing liquid to the front surface Wa of the workpiece W, and then rotates the workpiece W having the front surface Wa supplied with the processing liquid so that a film of the processing liquid is formed on the front surface Wa. FIG. 3 shows a state in which the processed film AF is formed on the workpiece W. As shown in FIG. 3, the liquid processing unit U1 includes a rotary holder 30 and a processing liquid supplier 40.

The rotary holder 30 holds and rotates the workpiece W. The rotary holder 30 includes, for example, a holder 32, a shaft 34 and a rotary driver 36. The holder 32 (support) supports the workpiece W. The holder 32 supports, for example, the central portion of the workpiece W horizontally arranged with the front surface Wa thereof facing upward, and holds the workpiece W by vacuum suction or the like. The upper surface of the holder 32 (the surface supporting the workpiece W) may be formed in a circular shape when viewed from above, and may has a radius of about ⅙ to ½ times the radius of the workpiece W. A rotary driver 36 is connected to the lower portion of the holder 32 via a shaft 34.

The rotary driver 36 is an actuator including a power source such as an electric motor or the like, and is configured to rotate the holder 32 about the vertical axis Ax. As the holder 32 is rotated by the rotary driver 36, the workpiece W held (supported) by the holder 32 is rotated. The holder 32 may hold the workpiece W such that the center of the workpiece W substantially coincides with the axis Ax.

The processing liquid supplier 40 supplies the front surface Wa of the workpiece W with the processing liquid. The processing liquid is a solution (resist) for forming a resist film. The processing liquid supplier 40 includes, for example, a nozzle 42, a supply source 44, a pump 45, an opening/closing valve 46 and a nozzle driver 48. The nozzle 42 injects the processing liquid onto the front surface Wa of the workpiece W held by the holder 32. For example, the nozzle 42 is arranged above the workpiece W (vertically above the center of the workpiece W) to inject the processing liquid downward. The supply source 44 supplies the processing liquid to the nozzle 42. The pump 45 may be provided between the supply source 44 and the nozzle 42 to adjust the supply amount of the processing liquid. The processing liquid in the flow path is pressurized by the pump 45 so that the processing liquid can be injected from the nozzles 42.

The opening/closing valve 46 is provided in the supply path between the nozzle 42 and the supply source 44. The opening/closing valve 46 switches the opening/closing state of the supply path. The nozzle driver 48 moves the nozzle 42 between an injection position above the workpiece W and a retracted position away from the injection position. The injection position is, for example, a position vertically above the rotation center of the workpiece W (a position on the axis Ax). The retracted position is set at, for example, a position outside the periphery of the workpiece W.

(Measurement Part)

Next, the measurement unit U3 will be described with reference to FIG. 4. The measurement unit U3 acquires information about the film thickness of the film formed by the liquid processing unit U1 and the heat treatment unit U2 as described above.

Figure 4:
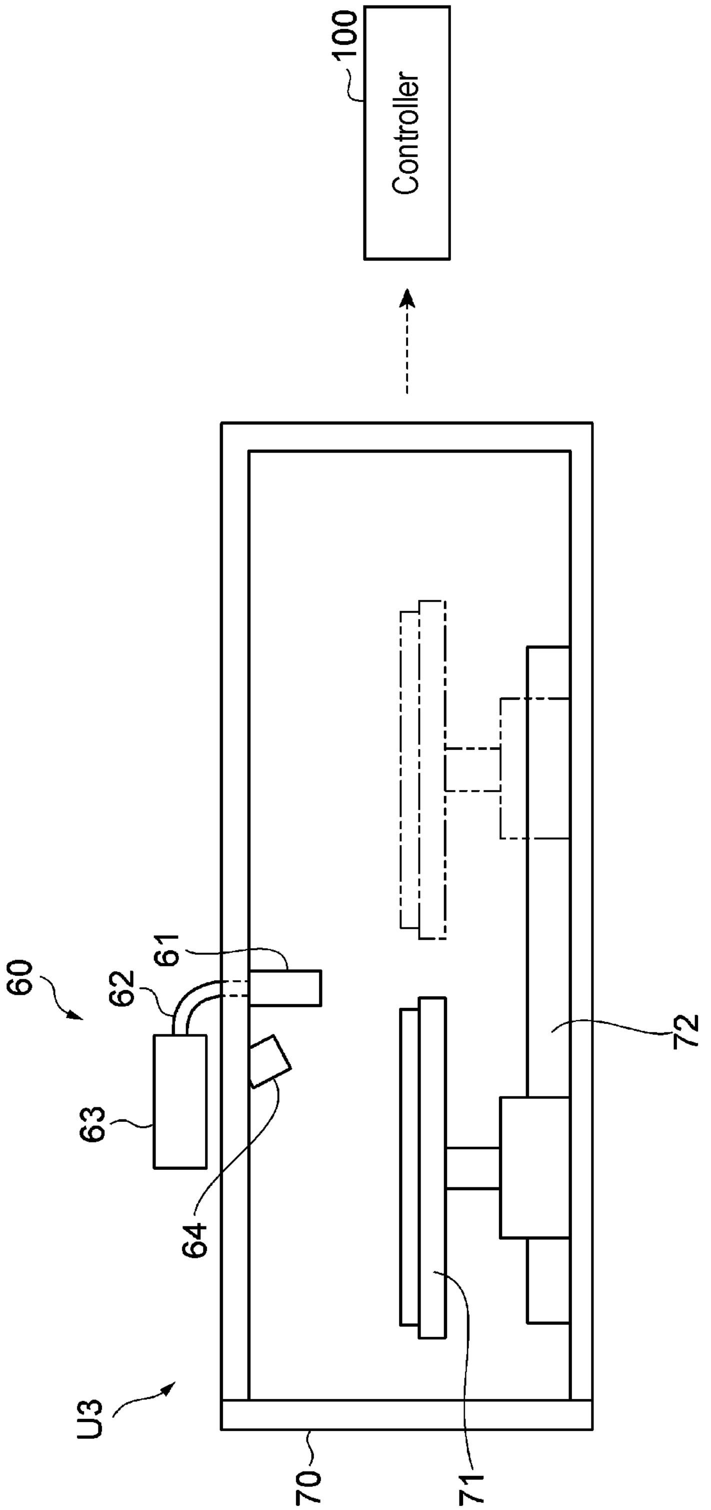
FIG. 4 is a schematic diagram showing an example of a measurement unit.

As shown in FIG. 4, the measurement unit U3 functions as a measurement part that performs measurement related to film thickness measurement. Specifically, the measurement unit U3 includes a spectroscopic measurement part 60, a housing 70, a holder 71, and a linear driver 72. The holder 71 holds the workpiece W horizontally. Further, the holder 31 may be configured such that the portion on which the workpiece W is placed can rotate with respect to the housing 70. The rotation axis at this time may be the center of the workpiece W held by the holder 31. In this case, the workpiece W can be rotated by rotating the upper portion of the holder 31. The linear driver 72 uses, for example, an electric motor as a power source, and moves the holder 71 along a horizontal linear path.

The spectroscopic measurement part 60 has a function of receiving light from the workpiece W, spectrally splitting the light, and acquiring a spectroscopic spectrum. The spectroscopic measurement part 60 includes an incident portion 61 for receiving light from the workpiece W, a waveguide 62 for guiding the light incident on the incident portion 61, a spectroscope 63 for acquiring a spectral spectrum by spectrally splitting the light guided by the waveguide 62, and a light source 64. The incident portion 61 is configured to receive light from the central portion of the workpiece W when the workpiece W held by the holder 71 is moved by the drive of the linear driver 72. That is, the incident portion 61 is provided at a position corresponding to the movement path of the center of the holder 71 that is moved by the drive of the linear driver 72. The incident portion 61 is attached so that the incident portion 61 moves relative to the front surface of the workpiece W along the radial direction of the workpiece W when the workpiece W is moved by the movement of the holder 71. Thus, the spectroscopic measurement part 60 can acquire the spectroscopic spectrum at each position along the radial direction of the workpiece W including the central portion of the workpiece W. The waveguide 62 is configured by, for example, an optical fiber or the like. The spectroscope 63 spectrally splits the incident light to obtain a spectral spectrum including intensity information corresponding to each wavelength. The light source 64 emits illumination light downward. As a result, the reflected light from the workpiece W enters the spectroscope 63 through the incident portion 61 and the waveguide 62.

The wavelength range of the spectral spectrum obtained by the spectroscope 63 may be, for example, the wavelength range of visible light (380 nm to 780 nm). Therefore, a light source that emits visible light is used as the light source 64, and the reflected light from the front surface of the workpiece W with respect to the light from the light source 64 is spectrally split by the spectroscope 63, whereby spectroscopic spectral data in the wavelength range of visible light (spectral data) can be obtained. The wavelength range of the spectral spectrum acquired by the spectroscope 63 is not limited to the range of visible light, and may be a wavelength range of the light including, for example, infrared rays and ultraviolet rays. Appropriate ones can be selected as the spectroscope 63 and the light source 64 according to the wavelength range of the acquired spectral spectrum data.

In the measurement unit U3, the linear driver 72 moves the holder 71. Thus, the workpiece W passes under the incident portion 61. In this passing process, the reflected light from each portion of the front surface of the workpiece W is incident on the incident portion 61 and is incident on the spectroscope 63 via the waveguide 62. The spectroscope 63 spectrally splits the incident light to obtain spectral spectrum data. When the film thickness of the film formed on the front surface of the workpiece W is changed, for example, the spectral spectrum is changed according to the film thickness. That is, acquiring the spectral spectrum data of the front surface of the workpiece W corresponds to acquiring information about the film thickness of the film formed on the front surface of the workpiece W. The measurement unit U3 can obtain information about the film thickness on the front surface of the workpiece W by performing spectroscopic measurement.

As described above, when the holder 71 is moved by the linear driver 72, the spectral spectrum at each position along the radial direction of the workpiece W including the central portion of the workpiece W can be acquired. The spectral spectrum is acquired multiple times at predetermined intervals while moving the holder 71. Therefore, for example, spectral spectrum data at multiple points along the radial direction of the workpiece W is acquired. In this case, by rotating the holder 71, the workpiece W can be rotated with respect to the moving direction of the holder 71 moved by the linear driver 72. While the workpiece W is being rotated, the spectral spectrum is acquired again at each position along the radial direction of the workpiece W including the central portion of the workpiece W. By repeating this operation, the spectral spectrum at each position dispersed over the entire surface of the workpiece W can be acquired. That is, it is possible to acquire a wide range of spectral spectra on the front surface of the workpiece W. Instead of rotating the holder 71, by repeating the operation of rotating the workpiece W with respect to the holder 71, the spectral spectra at plural points dispersed on the entire front surface of the workpiece W may be acquired Spectral spectrum data acquired by the spectroscope 63 is sent to the control device 100. The control device 100 can estimate the film thickness of the film formed on the front surface of the workpiece W based on the spectral spectrum data, and the estimation result is held in the control device 100 as an inspection result. Examples of the method of estimating the film thickness of the film formed on the front surface of the workpiece W from the spectral spectrum data include a method of creating a model for estimating the relationship between the film thickness of the film formed on the front surface of the workpiece W and the spectral spectrum data in advance. In this case, the film thickness can be estimated by applying the above model to the spectral spectrum data acquired from the workpiece W whose film thickness is to be estimated. However, the method of estimating the film thickness of the film formed on the front surface of the workpiece W is not limited to the above-described one.

In addition, in the substrate processing system 1, the conditions for forming the processed film AF can be adjusted based on the estimation result of the film thickness. Specifically, the control device 100 of the substrate processing system 1 adjusts the processing conditions for adjusting the film thickness estimation result and the target film thickness. The details of the method of adjusting the processing conditions will also be described later.

The spectroscopic measurement part 60 may be provided independently as the measurement unit U3 as described above, or may be provided in the liquid processing unit U1 or the heat treatment unit U2. In addition, by transferring the workpiece W processed in any unit to a separate unit, the film thickness of the workpiece W processed in a specific unit may be estimated.

(Control Device)

Figure 5:
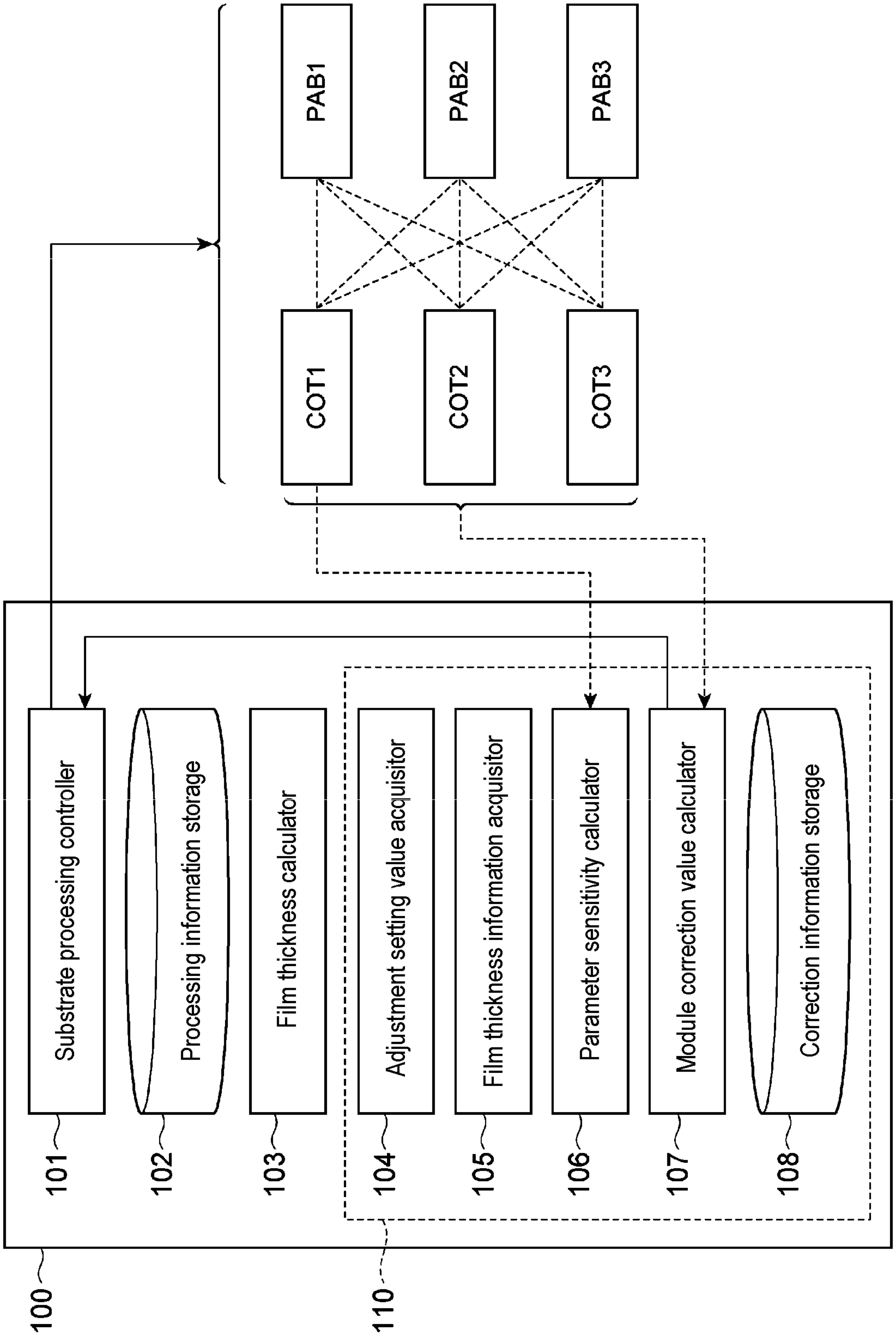
FIG. 5 is a block diagram showing an example of a functional configuration of a control device.

The control device 100 causes the coating developing apparatus 2 to process the workpiece W by partially or wholly controlling the coating developing apparatus 2. As shown in FIG. 5, the control device 100 includes, for example, a substrate processing controller 101, a processing information storage 102, a film thickness calculator 103, an adjustment setting value acquisitor 104 (parameter acquisitor), a film thickness information acquisitor 105, a parameter sensitivity calculator 106, a module correction value calculator 107 (parameter updater), and a correction information storage 108, as functional configurations (hereinafter referred to as "functional modules"). The processes executed by these functional modules correspond to the processes executed by control device 100. Of these, the adjustment setting value acquisitor 104, the film thickness information acquisitor 105, the parameter sensitivity calculator 106, the module correction value calculator 107, and the correction information storage 108 have a function as an inter-module adjuster 110 for adjusting the film thickness between the modules.

When the coating developing apparatus 2 processes the workpiece W, the control device 100 has a function of adjusting a setting value at the time of performing a process in each module in order to reduce the difference in film thickness distribution that occurs as a result of the processes performed in different modules. The inter-module adjuster 110 is a functional module for reducing the difference in process between the modules.

The modules assumed in the control device 100 correspond to the units that perform specific processes on the workpiece W, such as the liquid processing unit U1 and the heat treatment unit U2. In FIG. 5, as an example, there are shown three COT 1 to COT 3 corresponding to three liquid processing units U1 and three PAB 1 to PAB 3 corresponding to three heat treatment units U2 when forming a resist film as a processed film on a workpiece W. These are all included in one coating developing apparatus 2. For example, assume that the workpiece W passes through one liquid processing unit U1 (COT) and two heat treatment units U2 (PAB) so that a resist film is formed on the front surface of the workpiece W. That is, in the example shown in FIG. 5, the workpiece W passes through any of COT 1 to COT 3 and any of PAB 1 to PAB 3. However, the combination of COT and PAB is not fixed. Therefore, for example, the workpiece W processed by COT 1 is not necessarily processed by PAB 1.

A resist film is formed on the workpiece W processed in each module while receiving the characteristics of the processing in the COT or PAB in which the workpiece W is processed. Therefore, a difference in the film thickness distribution of the formed resist film may occur due to the difference in the module in which the film is processed. Conversely, if the film thickness distribution is to be made uniform regardless of which module it passes through, it is conceivable to correct the parameters that affect the film thickness distribution in each module so that the film thickness is not affected by the processing of the workpiece W in each module.

In order to achieve the above object, the control device 100 evaluates how much the parameters used in each module (processing unit) affect the film thickness distribution in the inter-module adjuster 110. Furthermore, the control device 100 adjusts the parameters of each module so that the film thickness distribution becomes uniform.

Next, each part of the control device 100 will be described.

The substrate processing controller 101 controls the liquid processing unit U1 and the heat treatment unit U2 (modules that perform film forming processes) so that the workpiece W is subjected to a predetermined process. The substrate processing controller 101 controls each part of the liquid processing unit U1 and the heat treatment unit U2 so as to perform liquid processing and heat treatment on the workpiece W according to various conditions defined in the processing information stored in the processing information storage 102.

The processing information storage 102 stores processing information about liquid processing and heat treatment for the workpiece W. Various conditions to be used when performing liquid processing and heat treatment are set in the processing information. For example, regarding the liquid processing, the timing (time) for starting and stopping injection of the processing liquid, the rotation speed (number of rotations) of the workpiece W when injecting the processing liquid, and the like are determined in advance as the setting values for various conditions. Furthermore, for example, the rotation speed of the workpiece W when forming a processed film on the front surface Wa after the processing liquid is supplied, the rotation time of the workpiece W when forming the processed film, the opening/closing time of the opening/closing valve 46, and the like are also determined in advance as the setting values for various conditions.

The processing information storage 102 stores a "parameter sensitivity acquisition recipe" and an "adjustment recipe" used when performing parameter correction between the modules, which will be described later. These recipes summarize the processing conditions in each unit when forming a film on the workpiece W in the coating developing apparatus 2. The "parameter sensitivity acquisition recipe" is a recipe that is used in the inter-module adjuster 110 when the parameter sensitivity that indicates how much a specific parameter affects the film thickness is first calculated in one module. Further, the "adjustment recipe" is a recipe used when specifying how much the parameter should be adjusted for each module after calculating the parameter sensitivity. How to use these recipes will be described later.

The film thickness calculator 103 has a function of estimating the film thickness of the processed film based on the measurement results of the measurement part. Specifically, when the spectral spectrum data acquired by the spectroscopic measurement part 60 is sent to the control device 100, the film thickness calculator 103 estimates the film thickness based on a pre-created model for estimating the relationship between the film thickness of the film on the front surface of the supported workpiece W and the spectral spectrum data. Accordingly, the film thickness calculator 103 can estimate the film thickness of the processed film based on the spectral spectrum data.

The calculation method performed by the film thickness calculator 103 is nothing more than an example, and may be changed as appropriate according to the configuration of the measurement part.

Figure 6A:
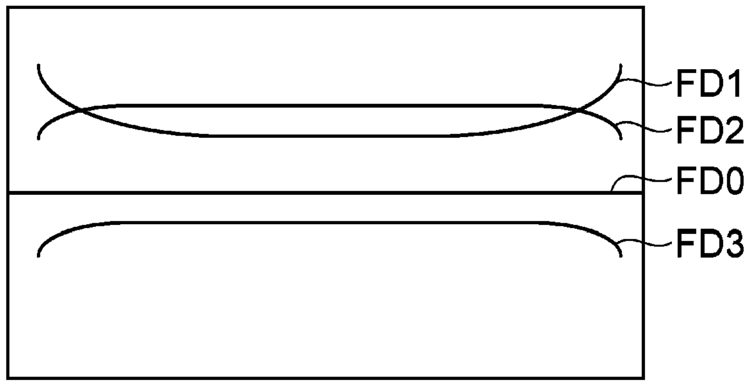
FIGS. 6A to 6C are diagrams for explaining the concept of inter-module parameter correction performed by the control device.

Next, each part of the inter-module adjuster 110 will be described. First, the concept of inter-module correction will be described with reference to FIGS. 6A to 6C. FIG. 6A schematically shows the film thickness distribution of the processed films AF formed through the modules different from each other. Here, as an example, there is shown the relationship between the film thickness distributions FD1 to FD3 of the processed films AF of the workpieces W processed by three modules different from each other and the target film thickness FD0. At this time, the tendencies of the film thickness distributions FD1 to FD3 are different from each other. Therefore, if the control parameter of each module is merely corrected (in the vertical direction) by uniformly changing the film thickness at the respective positions so that the average value of the film thicknesses of the respective workpieces W becomes the target value FD0, the film thickness distributions continue to be different. That is, since the film thickness distributions (profiles) of the processed films AF formed by the respective modules do not have the same tendency, even if the difference in the average value of the film thicknesses becomes small, the film thickness distributions differ greatly for the respective workpieces W.

Figure 6B:
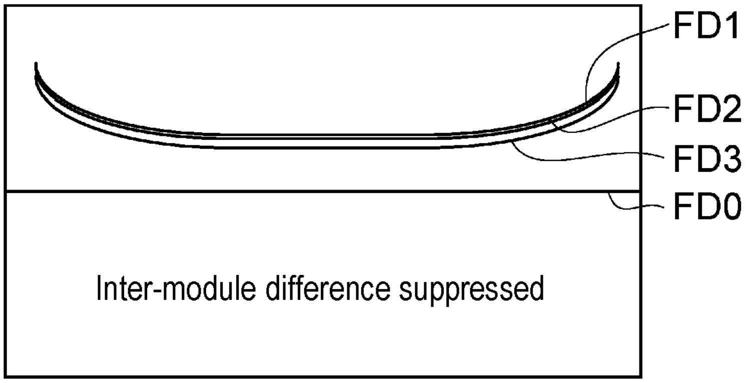
Figure 6C:
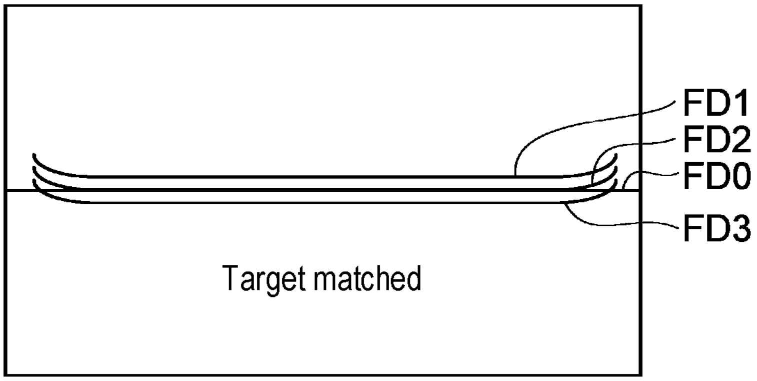

Therefore, as shown in FIG. 6B, the inter-module adjuster 110 first suppresses the difference in film thickness distribution derived from the modules. That is, the control parameters are adjusted so that the film thickness distributions FD1 to FD3 have the same tendency. In this state, the control parameters are further adjusted so that the average value of the film thicknesses becomes the target value P0. By adopting such a method, the film thickness is adjusted so that the film thickness distributions FD1 to FD3 are uniform and the average value thereof is constant as shown in FIG. 6C. In this manner, the inter-module adjuster 110 specifies the relationship between the film thickness distribution and the control parameters, and then adjusts the respective control parameters to suppress variations in the film thickness distribution between the modules.

The adjustment setting value acquisitor 104 acquires conditions related to the film formation of the processed film AF on the workpiece W, which are instructed by a user or the like. The conditions related to the film formation are the same kind of information as the information held in the processing information storage 102. Specifically, for example, as for the liquid processing, the timing (time) of starting and stopping the injection of the processing liquid, the rotation speed (number of rotations) of the workpiece W at the time of injecting the processing liquid, and the like are determined in advance. Further, for example, the rotation speed of the workpiece W when forming the processed film on the front surface Wa after supplying the processing liquid, the rotation time of the workpiece W when forming the processed film, the opening/closing time of the valve 46, and the like are also determined in advance. These pieces of information are, for example, information designated by a user or the like, and are conditions at the time of processing the workpiece W in the liquid processing unit U1 and the heat treatment unit U2 when it is assumed that the processed film AF having a predetermined film thickness is formed on the front surface of the workpiece W.

The film thickness information acquisitor 105 has a function of acquiring film thickness information related to the workpiece W on which a film is formed using a module to be subjected to an inter-module correction operation. The film thickness information acquisitor 105 acquires the film thickness calculation result when substrate processing is performed on the workpiece W according to the "parameter sensitivity acquisition recipe" and the "adjustment recipe". The acquired film thickness calculation result is used in the parameter sensitivity calculator 106 and the module correction value calculator 107, which will be described later.

The parameter sensitivity calculator 106 calculates the parameter sensitivity indicating the relationship between each control parameter and the film thickness distribution in the module that performs the substrate processing, from the film thickness calculation result acquired as a result of performing the substrate processing on the workpiece W based on the parameter sensitivity acquisition recipe.

The parameter sensitivity is information indicating the relationship between each control parameter and the film thickness in the module that processes the substrate as described above. There are many control parameters that can affect the film thickness when operating one module. If a user fails to grasp which control parameter affects the film thickness distribution to what extent, it is difficult to control the film thickness distribution to a predetermined state by changing the control parameters. Therefore, by acquiring the above parameter sensitivity in advance, the extent to which the control parameter included in the processing units affects the control of the film thickness distribution is specified for each control parameter.

In order to grasp the relationship between the control parameter and the film thickness distribution, experimental data is needed to grasp how the film thickness is changed when the control parameter as a liquid processing condition is changed within an assumed range in one module of the liquid processing unit U1. Therefore, first, the experimental conditions necessary for calculating the sensitivity for each control parameter are identified. Specifically, a well-known experimental design method or the like may be used to select appropriate experimental conditions and prepare an experimental condition table. Based on the type of control parameter, the numerical range and the like, a parameter sensitivity acquisition recipe is created that includes multiple processing conditions set differently from each other.

Next, based on the prepared experimental condition table, the film thickness of the processed film AF formed after the workpiece W is processed under multiple processing conditions is measured (estimated). As a method of calculating (estimating) the film thickness at this time, an estimating method based on the measurement results of the spectral spectrum may be used as in the method described above. As a result, information about the film thickness distribution of the processed film AF is obtained. From the experimental design table thus obtained and the film thickness distribution measurement results (experimental results), it is possible to specify how much each parameter contributes to the film thickness distribution of the processed film.

A feature quantity indicating the film thickness distribution is obtained from the measurement result of the film thickness distribution. As an example, approximation using a Zernike polynomial as a feature quantity indicating the film thickness distribution can be performed, and a coefficient related to each component can be used as the feature quantity.

The Zernike polynomial is a complex function on a unit circle of radius 1 (practically used as a real function) and have arguments (r, θ) of polar coordinates. The Zernike polynomial is mainly used to analyze the aberration components of lenses in the field of optics. By decomposing the wavefront aberration using the Zernike polynomial, it is possible to know the aberration components based on the shapes of independent wavefronts, such as a mountain shape, a saddle shape and the like.

In the present embodiment, the in-plane distribution of the film thickness in the plane of the workpiece W is regarded as a wavefront that undulates vertically. In this state, the Zernike polynomial can be used to decompose the film thickness distribution Z in the plane of the workpiece W into plural types of annular in-plane tendency components Zi including curved components that are curved convexly or concavely. The magnitudes of the respective in-plane tendency components Zi can be represented by Zernike coefficients.

The Zernike coefficients representing the respective in-plane tendency components Zi are specifically expressed by the following formulae using arguments (r, θ) of polar coordinates.

$$Z1(1)$$

$$Z2(r\cdot\cos\theta)$$

$$Z3(r\cdot\sin\theta)$$

$$Z4(2r^2-1)$$

$$Z5(r^2\cdot\cos 2\theta)$$

$$Z6(r^2\cdot\sin 2\theta)$$

$$Z7((3r^3-2r)\cos\theta)$$

$$Z8((3r^3-2r)\cdot\sin\theta)$$

$$Z9(6r^4-6r^2+1)$$

$$Z16(20r^6-30r^4+12r^2+1)$$

Among these Zernike coefficients, for example, coefficients Z1, Z4 and Z9 related to concentric curved components are used to express the film thickness distribution on the front surface of the workpiece W. That is, the film thickness variation is approximated as a Zernike polynomial using coefficients Z1, Z4 and Z9. At this time, the weighting coefficients for the coefficients Z1, Z4 and Z9 can serve as feature quantities.

The relationship between the feature quantity obtained from the measurement result of the film thickness distribution approximated as the Zernike polynomial and the control parameter in the processor is calculated from the above information. In other words, for each control parameter, identify that how much the weighting coefficients included in the Zernike polynomial is changed when the control parameter is varied by a specific amount, and, as a result, how much the film thickness distribution is changed when the control parameter is varied by a specific amount. The result may be the parameter sensitivity. A known method can be used for the calculation for calculating the correspondence between the Zernike polynomial and the control parameter. For example, a calculation is performed by combining the result matrix obtained from the film thickness estimation results obtained from the results of plural experiments performed based on the experimental table and the condition matrix created based on the experimental condition table. By this calculation, it is possible to obtain a matrix specifying how much each control parameter contributes to each of the Zernike coefficients. From this matrix, it is possible to obtain the relationship between each control parameter and the film thickness distribution.

Since the relationship between each control parameter and the film thickness distribution is changed depending on the processing conditions for the workpiece W, the relationship may be prepared each time when the conditions such as the type of the target workpiece W, the type of the processed film AF applied to the workpiece W, the target film thickness of the processed film AF, and the like are changed.

In the above description, there has been described the example where the feature quantity is calculated by performing approximation using the Zernike polynomial. However, approximation may be performed using a formula different from the Zernike polynomial.

The module correction value calculator 107 has a function of correcting the control parameters in each module using the relationship between the control parameter calculated by the parameter sensitivity calculator 106 and the film thickness distribution, so that the same film thickness and hence the same film thickness distribution can be obtained even when processing is performed in different modules. Through the above processing performed by the parameter sensitivity calculator 106, the relationship between each control parameter and the film thickness distribution in the module (processing unit) is grasped. On the other hand, by obtaining the film thickness distribution on the workpiece W processed by the module to be corrected, it is possible to grasp how much the film thickness distribution of the processed film AF on the workpiece W obtained by the module to be corrected differs from the film thickness distribution of the processed film AF on the workpiece W created by another module.

Further, based on the grasped difference, it is possible to calculate the correction amount of the control parameter for making the film thickness distribution uniform. Specifically, all the film thickness distributions of the workpiece W after being processed in the same type of module to be corrected are acquired. On the premise that the acquired film thickness distributions converge to a specific film thickness distribution, the difference between the film thickness distribution in each module and a specific film thickness distribution is specified. Then, a procedure is adopted to specify the adjustment amount of the control parameter for canceling the difference. This point will be described later.

The correction information storage 108 has a function of storing correction values of control parameters in each module calculated by the module correction value calculator 107. The stored correction values of the control parameters are used when the substrate processing controller 101 instructs each module to perform processing related to film formation.

Figure 7:
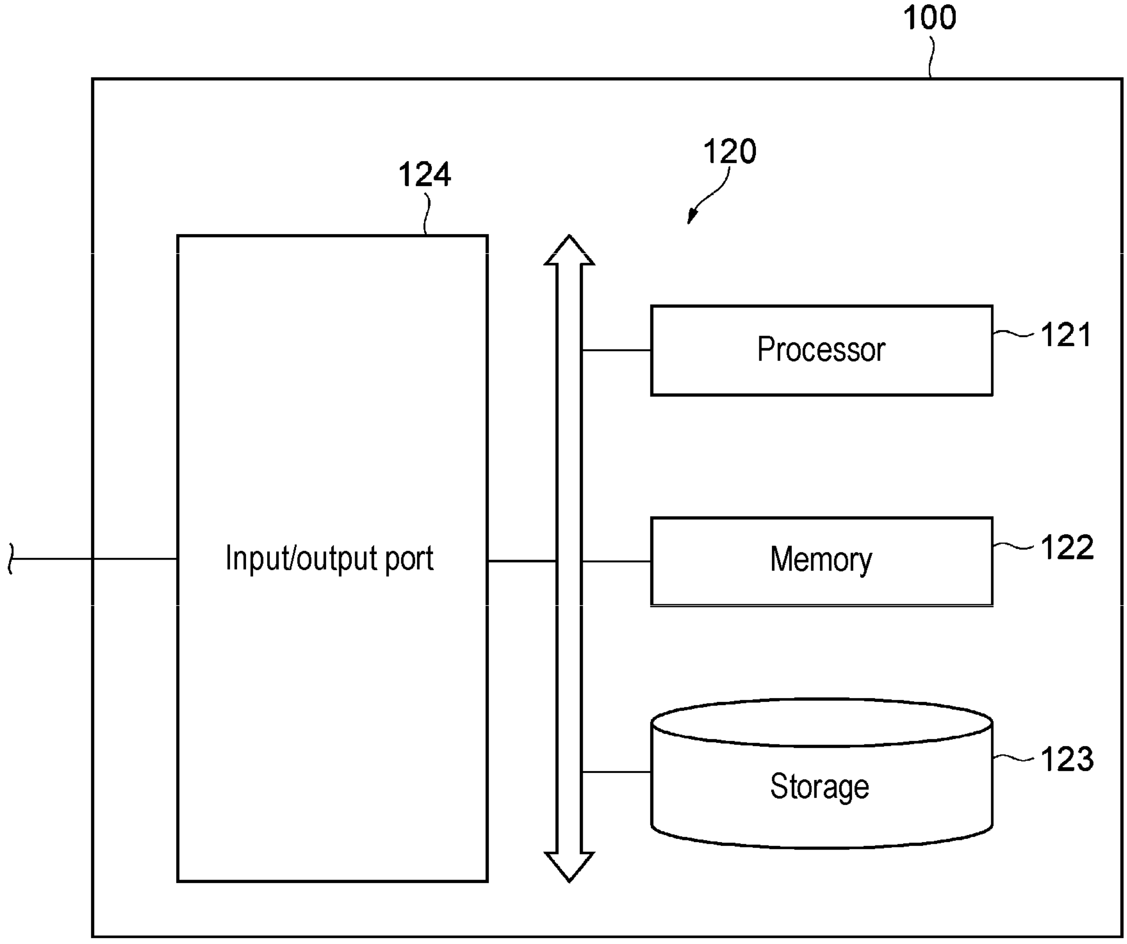
FIG. 7 is a block diagram showing an example of the hardware configuration of the control device.

The control device 100 described above is composed of one or more control computers. For example, the control device 100 includes a circuit 120 shown in FIG. 7. The circuit 120 includes one or more processors 121, a memory 122, a storage 123 and an input/output port 124. The storage 123 has a computer-readable storage medium such as a hard disk or the like. The storage medium stores a program for causing the control device 100 to execute a substrate processing method and a film thickness estimation method, which will be described later. The storage medium may be a removable medium such as a non-volatile semiconductor memory, a magnetic disk, an optical disk or the like.

The memory 122 temporarily stores the program loaded from the storage medium of the storage 123 and the calculation result obtained by the processor 121. The processor 121 cooperates with the memory 122 to execute the above program, thereby forming each of the above functional modules. The input/output port 124 performs input/output of electric signals into and from each part of the coating developing apparatus 2 according to commands from the processor 121.

When the control device 100 is composed of one or more control computers, each functional module may be realized by an individual control computer. The control device 100 may include a control computer including functional modules for executing liquid processing by the liquid processing unit U1 and the heat treatment unit U2, and a control computer including a functional module (film thickness calculator 103) for estimating the thickness of the processed film AF and a functional module (inter-module adjuster 110) for correcting the control parameters. Alternatively, each of these functional modules may be implemented by a combination of two or more control computers. In these cases, the control computers may cooperate to execute the substrate processing method and the film thickness estimation method, which will be described later, while being communicably connected to each other. The hardware configuration of the control device 100 is not necessarily limited to forming each functional module by a program. For example, each functional module of the control device 100 may be composed of a dedicated logic circuit or an ASIC (Application Specific Integrated Circuit).

[Control Method for Substrate Processing Apparatus]

Subsequently, as an example of a substrate processing method, an operation related to substrate processing executed by the control device 100 and an example of a process related to estimation of the thickness of the processed film AF by correcting the control parameters (control parameter setting method) will be described. In the control device 100, after calculating the parameter sensitivity using one module as described above, the parameter sensitivity is used to correct the control parameters of other modules.

The process described in the present embodiment may also be applied to correction of control parameters in two types of units that perform different processes on one workpiece W, such as the liquid processing unit U1 and the heat treatment unit U2. However, in the following description, basically, the case of correcting the control parameters in one type of module will be described for the sake of simplicity, and the case of applying it to two types of modules will be described as necessary.

Figure 8:
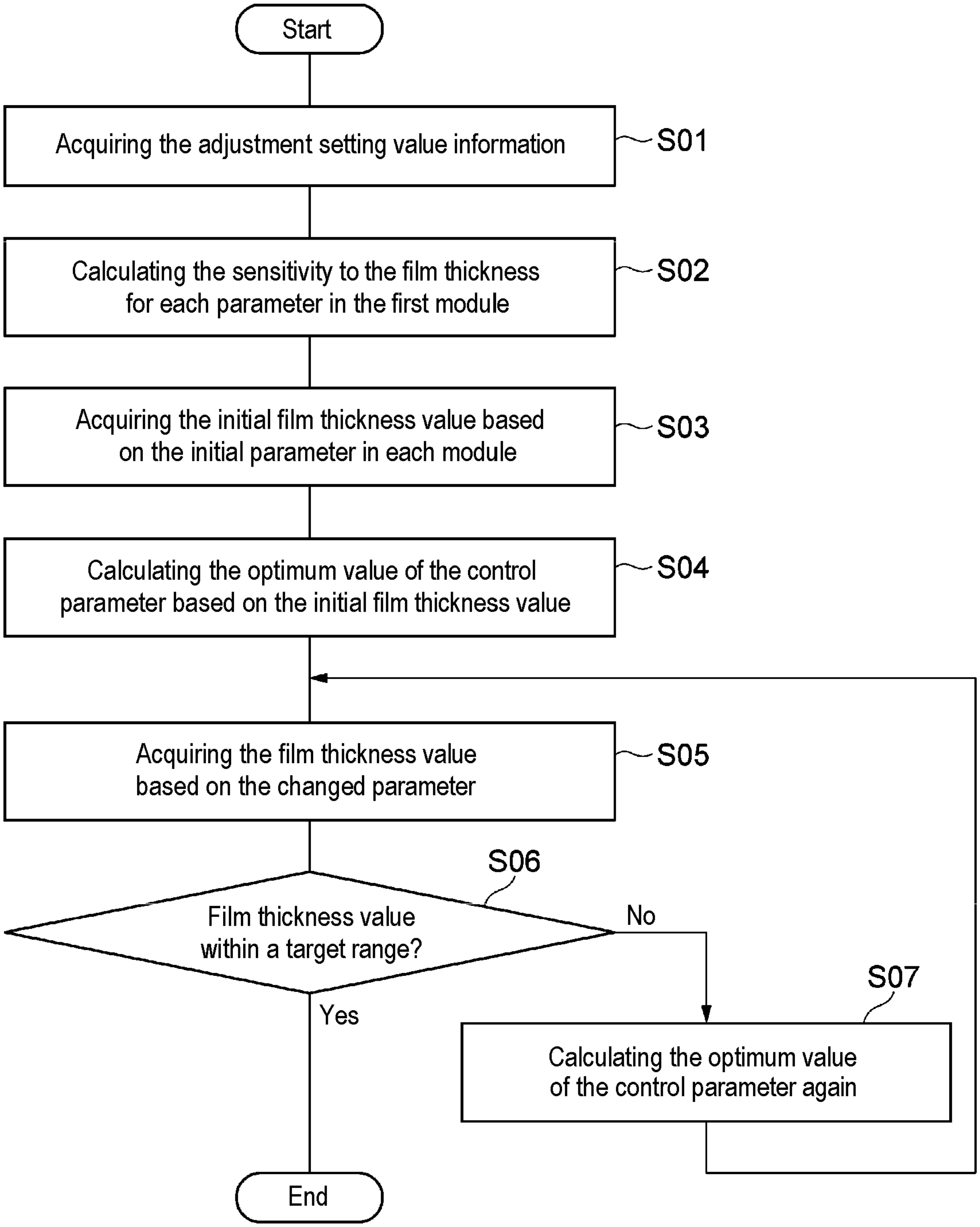
FIG. 8 is a flowchart showing an example of a control parameter setting method.

FIG. 8 is a flowchart showing an example of the above-described process executed by the control device 100. The control device 100 first executes step S01. In step S01, for example, the adjustment setting value acquisitor 104 acquires an adjustment setting value related to processing of the workpiece W. The adjustment setting value is specified by, for example, the user of the coating developing apparatus 2. Further, the adjustment setting value includes a setting value for each control parameter, and this setting value is used as an initial value before correction.

Next, the control device 100 executes step S02. In step S02, for example, the substrate processing controller 101 controls the processing module to perform substrate processing on the workpiece W based on the "parameter sensitivity acquisition recipe". The module to be used at this time is determined in advance (here, referred to as a first module), and the process related to the formation of the processed film is repeatedly performed while changing the setting of the control parameters in one module. Then, the film thickness distribution of the formed processed film is measured. The film thickness calculator 103 calculates the film thickness based on the measurement result of the measurement part (spectroscopic measurement part 60), and the film thickness information acquisitor 105 acquires the result. Further, the parameter sensitivity calculator 106 calculates the parameter sensitivity to the relationship between the control parameter and the film thickness distribution based on the film thickness distribution.

Next, the control device 100 executes step S03. In step S03, for example, the substrate processing controller 101 controls the processing module to perform substrate processing on the workpiece W based on the "adjustment recipe". At this time, in all the modules whose control parameters are to be corrected, the process related to the formation of the processed film is performed with the adjusted setting values, i.e., the initial values of the control parameters. Then, the film thickness distribution of the formed processed film is measured. The film thickness calculator 103 calculates the film thickness distribution based on the measurement result obtained by the spectroscopic measurement part 60, and the film thickness information acquisitor 105 acquires the result.

When correcting the control parameters for one type of module, the substrate is processed under the same other conditions while changing the module, whereby data in which the difference in characteristics between modules is reflected in the film thickness distribution can be obtained. Further, when correcting the control parameters of two types of modules that perform different processes on one workpiece W, the substrate processing is performed, for example, while fixing the first type of module and changing the second type of module. By performing the process in this manner, data in which the difference in characteristics between the modules is reflected in the film thickness distribution is obtained for the second type of module. In addition, by processing the substrate while fixing the second type of module and changing the first type of module, data in which the difference in characteristics between the modules is reflected in the film thickness distribution is obtained for the first type of module. In this way, the configuration of the recipe can be changed by setting the module for which the control parameters are to be corrected.

Next, the control device 100 executes step S04. In step S04, for example, the module correction value calculator 107 uses the film thickness distribution obtained in step S03, the initial values of the control parameters, and the parameter sensitivity obtained in advance to calculate correction values (optimal values of the control parameters) for reducing the difference in film thickness between the processing films formed in each module. The calculated correction value may be held in the correction information storage 108.

The parameter correction values can be calculated by, for example, treating the correction values for correcting a bias in the film thickness distribution as a problem of quantification of type I and obtaining a solution by solving this problem. This method will be described with reference to FIGS. 9A and 9B.

In FIG. 9A, it is assumed that there are eight modules in the liquid processing unit U1 (COT). Specifically, it is assumed that there are four modules COT 11-1 to COT 11-4 and four modules COT 12-1 to COT 12-4. Here, it is assumed that these eight modules are affected by two parameters. That is, since the COT 11-1 to COT 11-4 and the COT 12-1 to COT 12-4 are provided in different floor (installation locations in the apparatus), the operation recipes are different. Further, it is assumed that the eight modules are supplied with a processing liquid by four pumps. Specifically, the COT 11-1 and COT 11-2 are operated with a pump 11-12, the COT 11-3 and COT 11-4 are operated with a pump 11-34, the COT 12-1 and COT 12-2 are operated a pump 12-12, and the COT 12-3 and COT 12-4 are operated with a pump 12-34. At this time, for example, the COT 11-1 and COT 11-2 are controlled by the same control parameters, but are controlled by the pump different from that of the COT 11-3 and COT 11-4. Therefore, for example, in order to make the film thickness distribution in the COT 11-1 to COT 11-4 uniform, it is conceivable to adjust the parameter related to the operation of the pump. Furthermore, in order to make the film thickness distribution uniform between the COT 11 group and the COT 12 group, it is necessary to adjust the parameter between the operation recipe of the COT 11 and the operation recipe of the COT 12.

FIG. 9B describes such a state as a problem of quantification of type I. Here, it is assumed that the film thickness distribution FT in each module can be described by the sum of the total average of all modules, the variation components [COT 11-1 to COT 12-4] derived from the respective modules and the error. The total average can be obtained by averaging coefficients such as Z1, Z4 and Z9 when the film thickness distribution in each module is approximated by a Zernike polynomial.

In addition, the components [COT 11-1 to COT 12-4] derived from the respective modules can be respectively decomposed into the sum of the variation components derived from the floor [the 11th floor component and the 12th floor component] and the variation components derived from the related pumps [the $pump_{111}$ component, the $pump_{113}$ component, the $pump_{121}$ component and the $pump_{123}$ component]. Further, as the setting of a problem of quantification of type I, it is assumed that the total sum of the variation components [COT 11-1 to COT 12-4] derived from the respective modules is zero. That is, it is assumed that the sum of the 11th floor component or the 12th floor component after decomposition is zero, the sum of the $pump_{111}$ component and the $pump_{113}$ component is zero, and the sum of the $pump_{121}$ component and the $pump_{123}$ component is zero. In this regard, each component of the Zernike polynomial is set to satisfy the above relationship.

By calculating each component [the 11th floor component, the 12th floor component] and [the $pump_{111}$ component, the $pump_{113}$ component, the $pump_{121}$ component, or the $pump_{123}$ component] so as to satisfy all the above relational expressions, it is possible to obtain a contribution amount indicating how much each component in each module affects the film thickness distribution. Further, the correction value can also be calculated by calculating the contribution amount of each component, for example, by calculating an inverse matrix or the like.

Thus, the parameter correction value can be calculated by setting the correction value for correcting the bias of the film thickness distribution as a problem of quantification of type I problem and solving the problem. That is, by setting the calculation of the correction value related to the film thickness distribution as a problem of quantification of type I, a solution can be obtained by using a known method.

Returning to FIG. 8, the control device 100 executes step S05. In step S05, for example, the substrate processing controller 101 controls the processing modules to perform a process in each module using the control parameters changed using the correction values. Then, the film thickness of the processed film AF formed as a result is measured by the spectroscopic measurement part 60 to acquire the film thickness value (film thickness distribution). The method of acquiring the film thickness distribution is the same as before.

Next, the control device 100 executes step S06. In step S06, the module correction value calculator 107 refers to the film thickness distribution obtained in step S05 and checks whether the film thickness distribution is within a target range. In this regard, the determination may be made from the viewpoint of whether the variation in film thickness distribution between modules is within a predetermined range, or from the viewpoint of whether the dispersion of the film thickness distribution in a specific module is within a predetermined range. Further, if determined in advance, it may be determined whether or not the film thickness of the processed film AF on the workpiece W is close to a target profile by using the variance of the difference from a target in-plane tendency profile. If the film thickness distribution is within the target range as a result of this determination (S06: YES), the process is terminated. On the other hand, if the film thickness distribution does not fall within the target range (S06: NO), the film thickness distribution obtained in step S05 and the control parameters used when acquiring this film thickness distribution are used to calculate a correction value again (step S07). Steps S05 and S06 (and step S07 if necessary) are repeated until the film thickness distribution falls within the target range.

Figure 10:
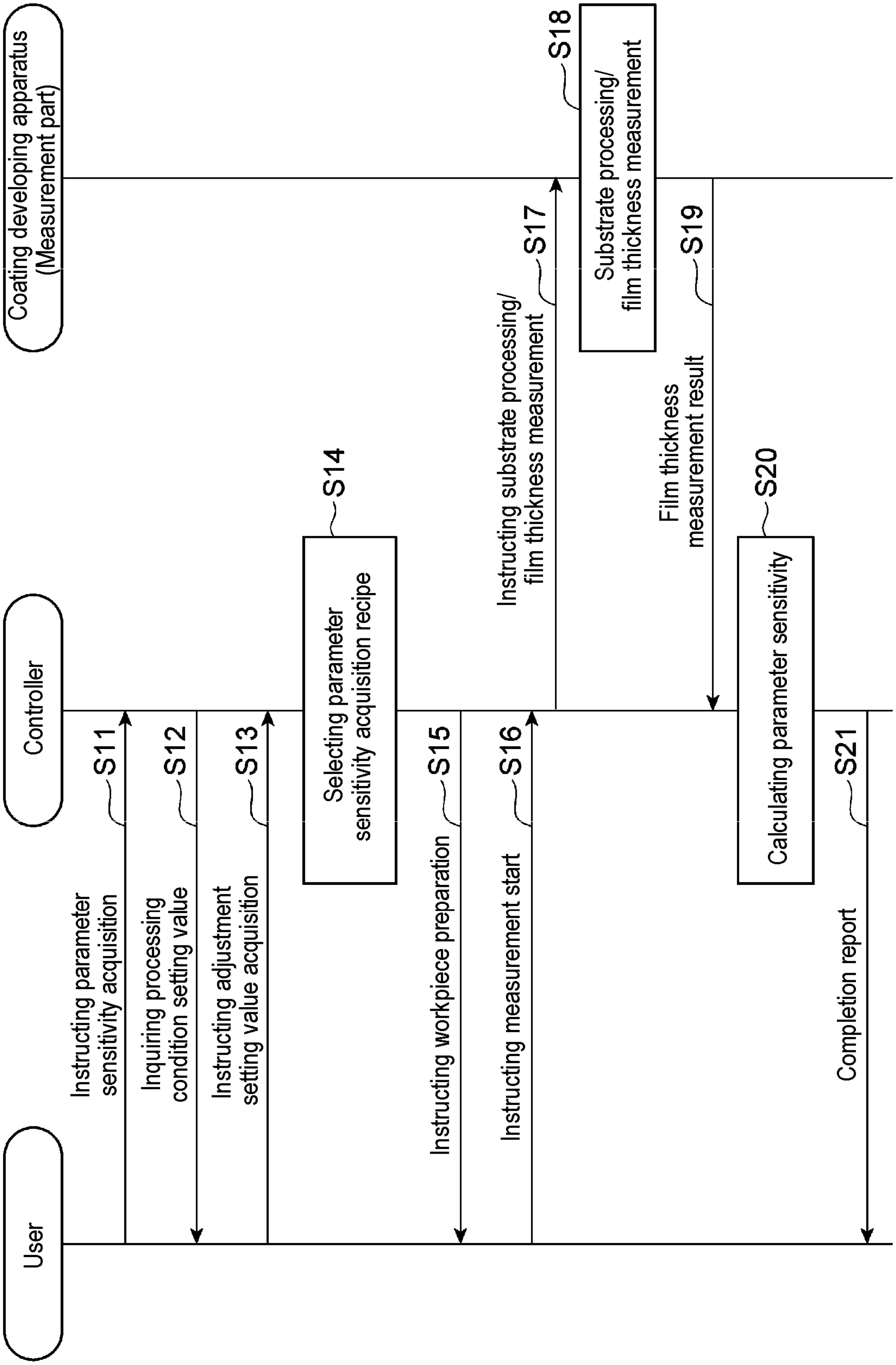
FIG. 10 is a sequence diagram showing an example of a parameter sensitivity calculation method.
Figure 11:
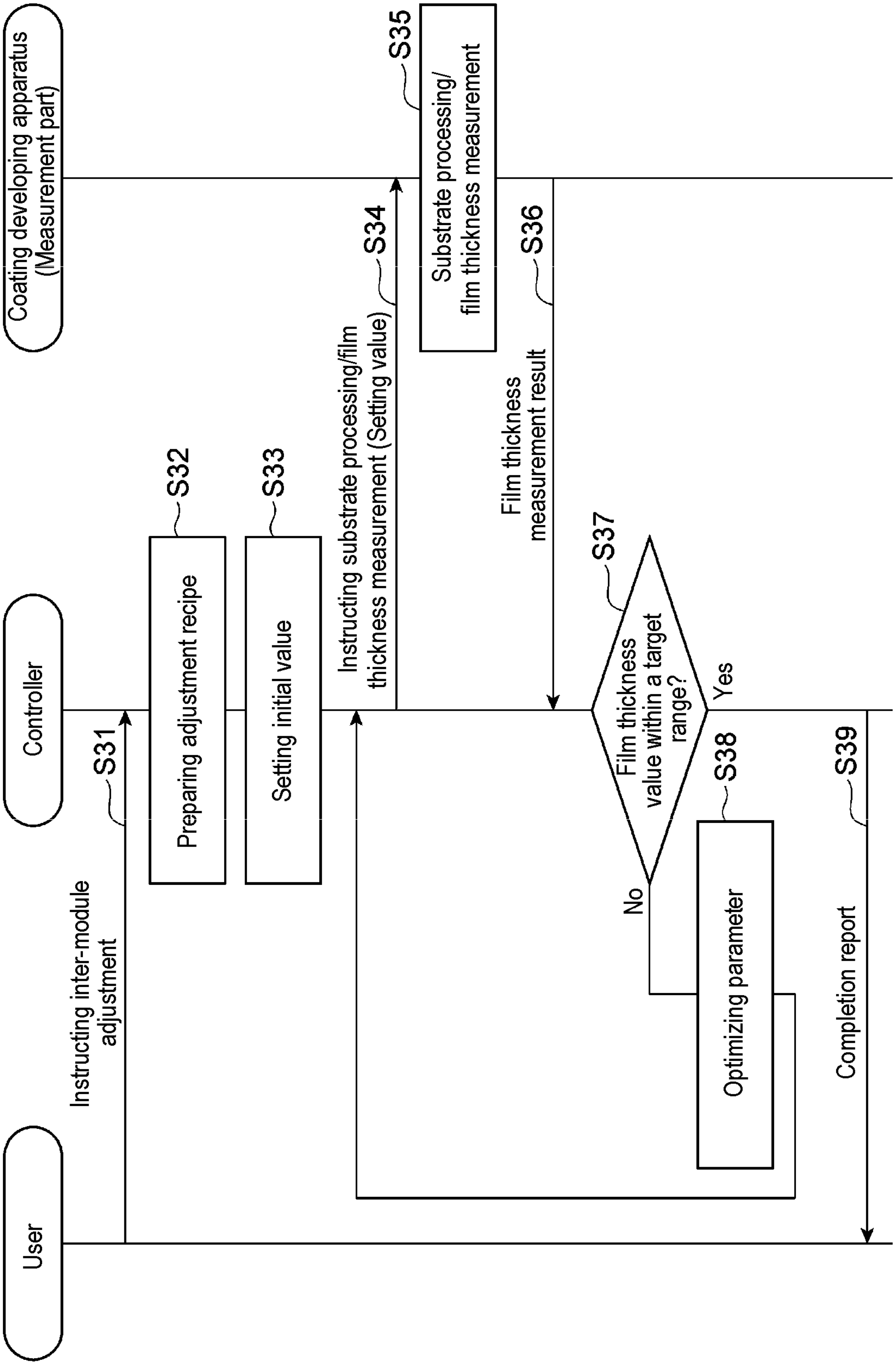
FIG. 11 is a sequence diagram showing an example of a parameter correction value calculation method.

Next, the exchange of instructions and the like between the user, the control device 100 and the coating developing apparatus 2 (especially the processing module and the measurement part) will be described with reference to FIGS. 10 and 11. FIGS. 10 and 11 show information and the like exchanged with the user for executing each step of the flowchart shown in FIG. 8.

FIG. 10 is a flowchart showing the processing procedure at the stage corresponding to steps S01 and S02 in FIG. 8.

First, the user instructs the control device 100 to acquire the parameter sensitivity (step S11). In response to this instruction, the control device 100 inquires of the user (step S12) to acquire an adjustment setting value (step S13). Based on this adjustment setting value, the control device 100 selects a parameter sensitivity acquisition recipe corresponding to the adjustment setting value from the recipes stored in the processing information storage 102 (step S14).

Since the required number of workpieces is determined based on the parameter sensitivity acquisition recipe, the control device 100 instructs the user to prepare workpieces (step S15). The user prepares workpieces and then instructs starting measurement (step S16). Based on the user's instruction, the control device 100 instructs and controls the substrate processing based on the parameter sensitivity acquisition recipe and the measurement of the film thickness distribution of the workpieces W after the substrate processing (step S17). Based on this, in the coating developing apparatus 2, substrate processing is performed on the workpiece W in the designated module, and the film thickness after the processing is measured by the measurement part (spectroscopic measurement part 60 of the measurement unit U3) (step S18). The measurement result is sent from the spectroscopic measurement part 60 of the coating developing apparatus 2 to the control device 100 (step S19). The control device 100 calculates the film thickness distribution from the measurement result, and further calculates the sensitivity of the control parameter (parameter sensitivity) from the film thickness distribution (step S20). When the series of processes is completed, the control device 100 transmits a completion report notifying the user of the completion of the process (step S21), so that the user can grasp that the process related to the parameter sensitivity acquisition has been completed. A configuration may be adopted in which information related to the calculated parameter sensitivity is notified at the same time as the transmission of the completion report.

FIG. 11 is a diagram for explaining the processing procedure at the stage corresponding to steps S03 to S07 in FIG. 8.

First, the user instructs the control device 100 to perform inter-module adjustment (step S31). In response to this, the control device 100 prepares an adjustment recipe for inter-module adjustment from among the recipes stored in the processing information storage 102 (step S32). Further, the initial value of the adjustment setting value is set when processing is performed according to the adjustment recipe (step S33). To this end, the information acquired in the process related to parameter sensitivity acquisition in FIG. 10 (step S13) may be used.

Next, the control device 100 instructs and controls the substrate processing based on the adjustment recipe and the measurement of the film thickness distribution of the workpiece W after the substrate processing (step S34). Based on this, in the coating developing apparatus 2, substrate processing is performed on the workpiece W in each module, and the film thickness after the processing is measured by the spectroscopic measurement part 60 (step S35). The measurement result is sent from the spectroscopic measurement part 60 of the coating developing apparatus 2 to the control device 100 (step S36), and the control device 100 calculates the film thickness distribution from the measurement result. At this time, it is determined whether or not the calculated film thickness distribution is within a target range (step S37). If the calculated film thickness distribution is not within the target range (S37: NO), the parameters are optimized (step S38), and the substrate processing (step S34) in the coating developing apparatus 2 is repeated again. On the other hand, if the calculated film thickness distribution is within the target range (S37: YES), the controller 100 transmits a completion report notifying the user of the completion of processing (step S39). The user can grasp that the processing related to parameter sensitivity acquisition has been completed. A configuration may be adopted in which information related to the calculated parameter correction value is notified at the same time as the transmission of the completion report.

Modification

In the above-described embodiment, there has been described the case where inter-module adjustment is performed so that the difference in film thickness distribution becomes small. Here, in addition to the series of processes described above, a modification that can be executed by the coating developing apparatus 2 including the control device 100 will be described.

(Calculation of Offset Amount)

As described above, when calculating the film thickness, the measurement by the measurement part is essential. However, if the film thickness estimation result obtained by the spectroscopic measurement part 60 of the measurement unit U3 functioning as a measurement part does not correspond to the actual film thickness of the workpiece W, the correction of the control parameters using estimation results may also result in inaccurate results. Therefore, when estimating the film thickness using the measurement obtained by the measurement part, it is required to perform offset adjustment in advance. Therefore, before correcting the control parameters using the parameter sensitivity as described above, the offset adjustment for the measurement result itself obtained by the measurement using the spectroscopic measurement part 60 of the measurement unit U3 may be performed.

Figure 12:
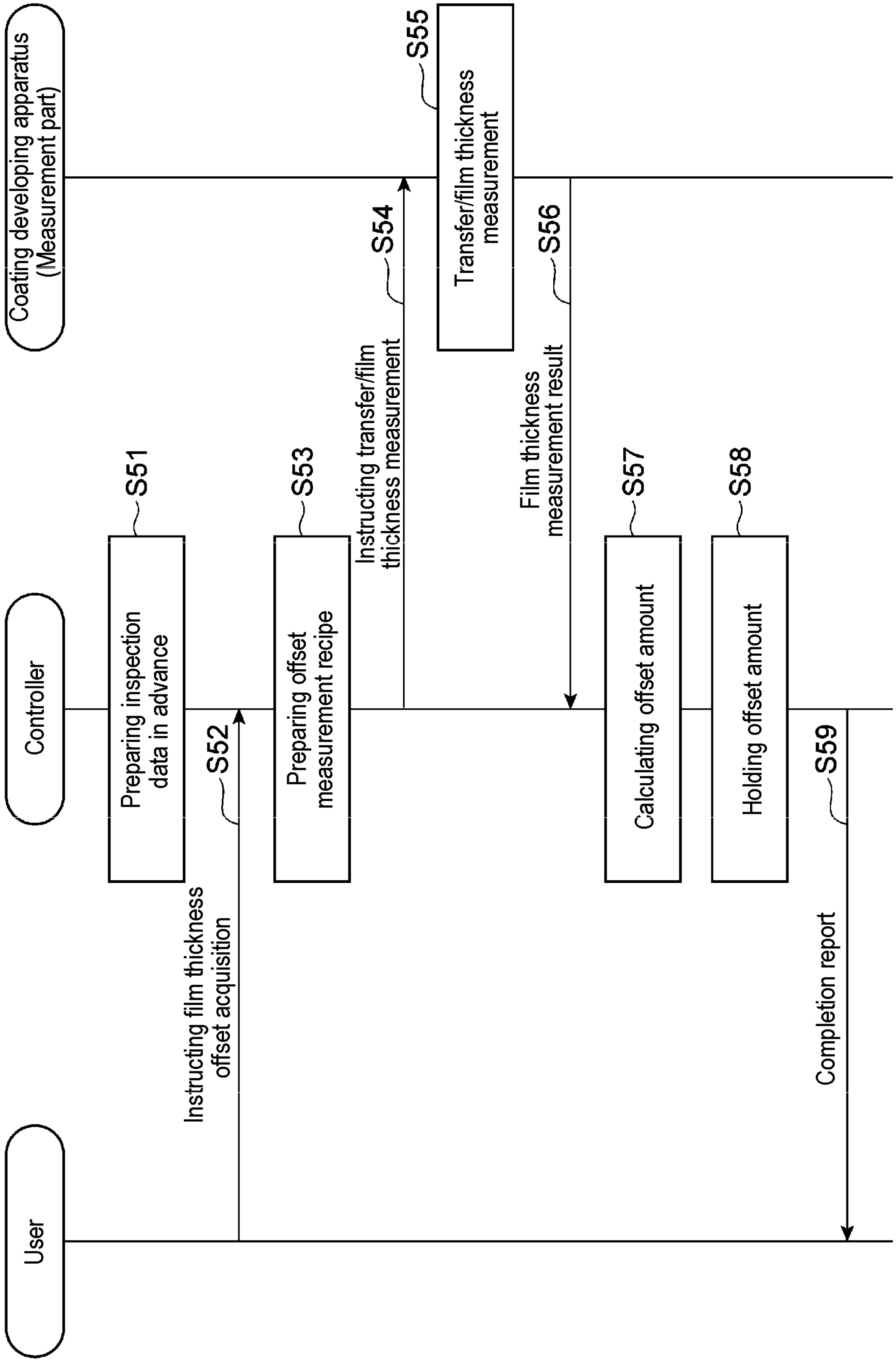
FIG. 12 is a sequence diagram showing an example of an offset amount calculation method.

FIG. 12 shows an example of a procedure for offset adjustment. The basic flow is similar to the examples shown in FIGS. 10 and 11.

First, as advance preparation, the control device 100 prepares a workpiece W having a known film thickness, i.e., a workpiece W for which inspection data is obtained (step S51). The film thickness of the workpiece W can be measured using, for example, another film thickness measurement device.

The user instructs the control device 100 to acquire the offset of the measurement part (step S52). In response to this, the control device 100 prepares a recipe corresponding to the offset adjustment from the recipes stored in the processing information storage 102 (step S53). This recipe is a recipe for controlling the coating developing apparatus 2 so as to measure the film thickness of the workpiece W having a known film thickness by the spectroscopic measurement part 60 of the measurement unit U3.

When the recipe is prepared, the control device 100 executes instruction and control so as to transfer the workpiece W having the known film thickness to the measurement unit U3 and measure the film thickness distribution on the workpiece W (step S54). Based on this, in the coating developing apparatus 2, the film thickness of the workpiece W is measured by the designated spectroscopic measurement part 60 (step S55). The measurement result is sent from the spectroscopic measurement part 60 of the coating developing apparatus 2 to the control device 100 (step S56), and the control device 100 calculates the film thickness distribution from the measurement result. By comparing the calculated film thickness distribution with the inspection data, the offset amount can be calculated in the spectroscopic measurement part 60 (step S57). This offset amount is stored in the processing information storage 102 of the control device 100 (step S58). Thus, by performing correction using the offset amount at the time of next and subsequent measurement by the spectroscopic measurement part 60, the estimation result of the film thickness can be calculated more accurately. When the series of processes is completed, the control device 100 transmits a completion report notifying the user of the completion of the process (step S59).

If the offset amount is calculated before correcting the control parameters by such control of the control device 100, it is possible to easily perform the calculation process of the offset amount, which is performed when starting up the coating developing apparatus 2.

(Parameter Management Using Correction Group)

Next, a method of using the correction values of the control parameters in other manufacturing procedures (recipes) will be described. In the above-described embodiment, there has been described the method of calculating the correction values of the control parameters between the modules when forming the processed film AF with the specific adjustment setting value. Here, if there is a procedure for manufacturing another product using the same adjustment setting value, it is thought that the variation in the film thickness distribution can be suppressed even in the procedure of manufacturing the product by applying the correction values of the control parameters calculated by the above method. Thus, a method of sharing the correction values of the control parameters between recipes will be described.

Figure 13A:
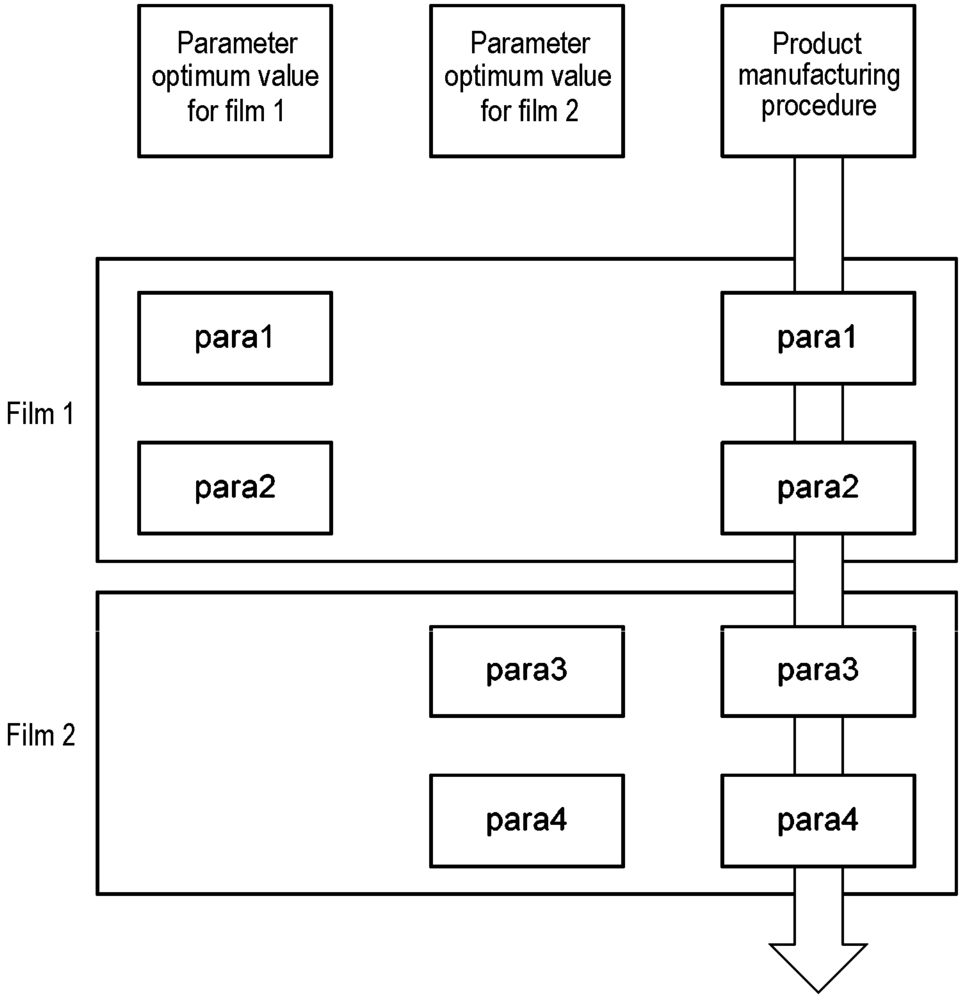
FIGS. 13A and 13B are sequence diagrams showing an example of a parameter correction value sharing method.

FIG. 13A is a diagram illustrating a situation in which a parameter reflection value reflecting a correction value is shared. Here, it is assumed that the optimum values of parameters for reducing variations in film thickness distribution between modules when manufacturing "film 1" are obtained as "para1" and "para2" using the above method. Similarly, it is assumed that the optimum values of parameters for reducing variations in film thickness distribution between modules when manufacturing "film 2" are obtained as "para3" and "para4" using the above method. Meanwhile, it is assumed that a procedure for forming film 2 after forming film 1 is specified as a procedure for manufacturing a certain product. In this case, for each of films 1 and 2, parameters for reducing variations in film thickness distribution between modules have already been obtained. Therefore, it is presumed that by using these parameters "para 1 to 4", films 1 and 2 can be formed while reducing variations in film thickness distribution between modules. Thus, it can be said that the optimum parameter values for forming film 1 under certain conditions can also be used as the optimum parameter values for other processing procedures for forming film 1 under the same conditions.

Figure 13B:
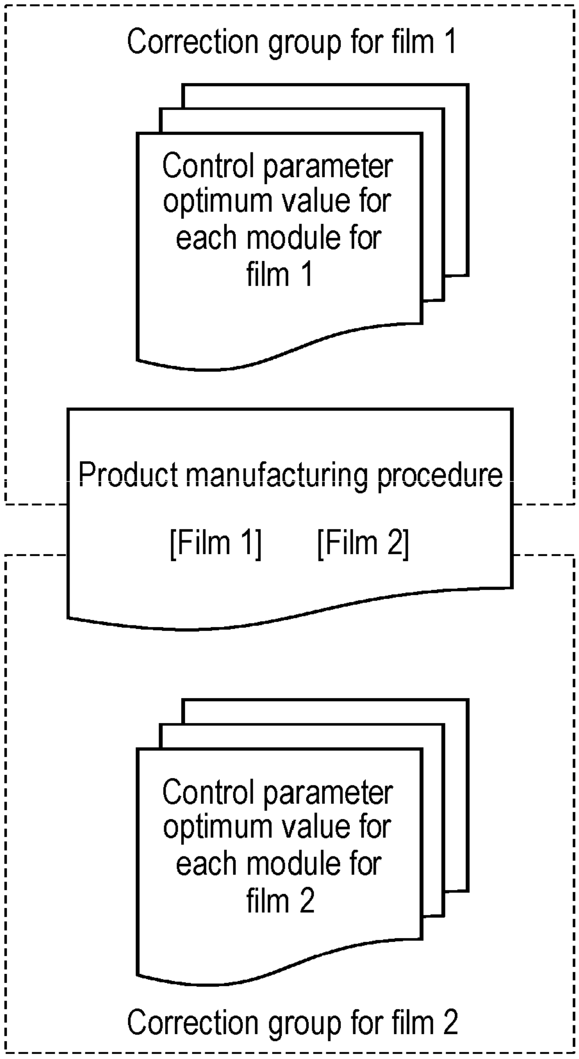

Therefore, as shown in FIG. 13B, procedures for forming films (e.g., film 1, film 2, and the like) under specific conditions are treated as the same "group", and the predetermined optimum parameter values for forming film 1 are applied the procedures belonging to the same group. By adopting such a configuration, it is possible to prevent the correction values (optimum values) of the control parameters from being newly calculated each time when the manufacturing procedure of the product is changed.

For example, it is conceivable that tagging is used as a method of determining which group a procedure of manufacturing a specific product belongs to and making association. For example, by adding tags "film 1" and "film 2" to the "product manufacturing procedure" shown in FIG. 13B, it is specified that the "product manufacturing procedure" uses "film 1" and "film 2". In addition, by adding these tags, when executing the product manufacturing procedure, the optimum values of the control parameters related to "film 1" and the optimum values of the control parameters related to "film 2" can be automatically recognized by the control device 100. In this way, by adopting the configuration in which the procedure of manufacturing a certain product can be associated with the separately calculated optimal values (correction values) of the control parameters, it is possible to effectively utilize the once calculated optimal values (correction values) of the control parameters.

(Delivery of Information Between Coating Developing Apparatuses)

In the above-described embodiment, there has been described the method of reducing the difference in film thickness distribution between modules in one coating developing apparatus 2. However, it is conceivable that the information related to parameter sensitivity among the various types of information used in the procedure described above can be shared with other coating developing apparatuses 2.

The method of reducing the difference in film thickness distribution between modules is required to perform substrate processing and film thickness measurement using the actual adjustment recipe in each module because correction considering the features of each module is necessary. Meanwhile, it can be considered that the sensitivities of various parameters related to the operations of the modules are the same between the same modules that perform the same process (e.g., coating of the same processed film) regardless of the apparatus or module. Accordingly, the adjustment setting values and the parameter sensitivity information in the processing modules at the adjustment setting values may be shared among the coating developing apparatuses 2.

Figure 14:
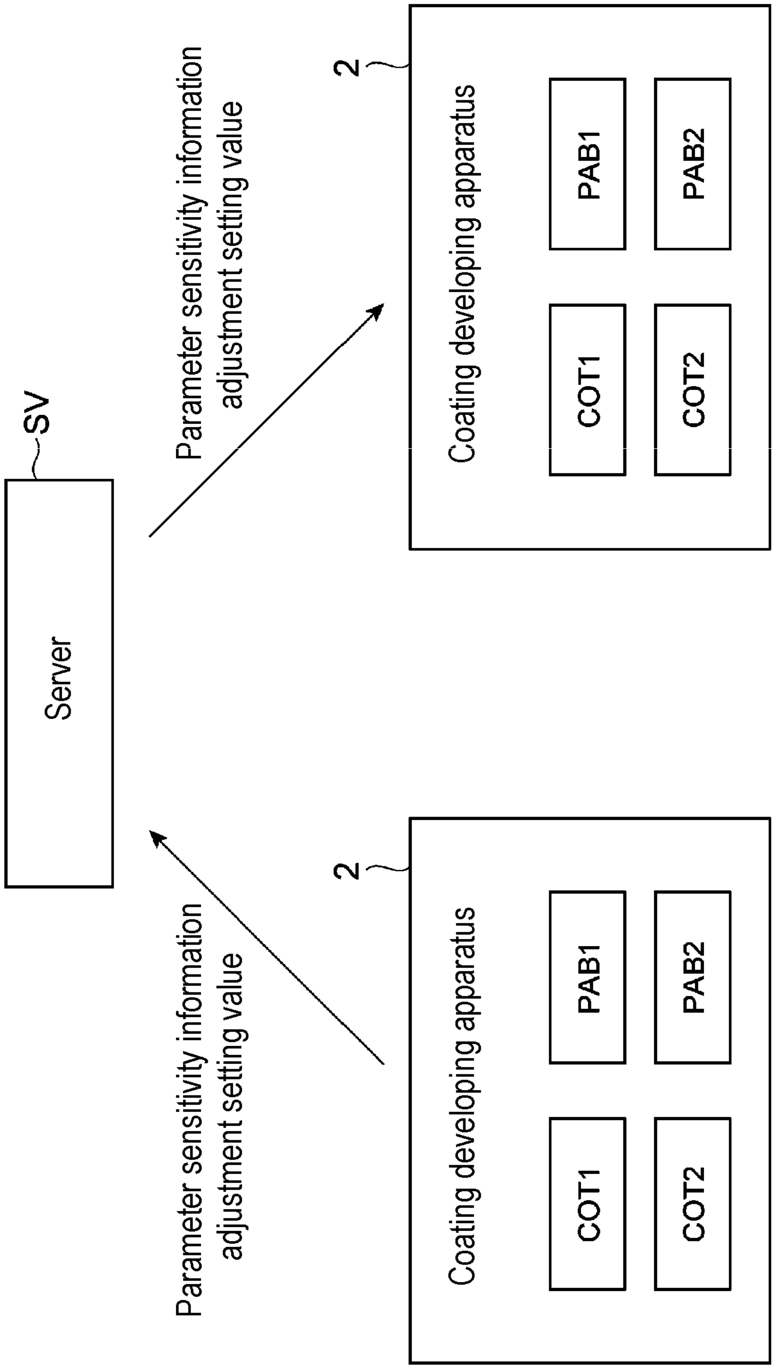
FIG. 14 is a diagram showing an example of a method of sharing parameter sensitivity information between the coating developing apparatuses.

Various types of information can be used for exchanging data between the coating developing apparatuses 2. FIG. 14 shows, as an example, a configuration for transmitting and receiving information via a server SV. That is, it is assumed that the information related to the parameter sensitivity acquired in one of the coating developing apparatuses 2 and the adjustment setting values used when measuring the parameter sensitivity are transmitted to the server SV and held in the server SV. At this time, another coating developing apparatus 2 may search the server SV based on the adjustment setting values, for example, and may acquire and use information related to the corresponding parameter sensitivity. The server SV may be provided at a place where it is always connected to multiple coating developing apparatuses 2, or may be provided at a place where many coating developing apparatuses 2 such as a cloud and the like can be connected to the server SV. By sharing the information related to the parameter sensitivity among the coating developing apparatuses 2 in this way, it is possible to calculate the correction values for reducing the difference in the film thickness distribution between the modules while omitting the measurement related to the parameter sensitivity.

(Adjustment of Valve Closing Timing and Injection Amount in Liquid Processing Unit)

Next, a case where the closing timing of the opening/closing valve 46 in the processing liquid supplier 40 is used as one of the control parameters in the liquid processing unit U1 will be described. It has been confirmed that the film thickness distribution on the front surface of the workpiece W is changed by adjusting the closing timing of the opening/closing valve 46. Therefore, the closing timing of the opening/closing valve 46 may be used as one of the control parameters in the liquid processing unit U1. The closing timing refers to a timing at which the opening/closing valve 46 is switched from a state where the processing liquid is being supplied from the processing liquid supplier 40 to the workpiece W to a closed state. By switching the opening/closing valve 46 to the closed state, the supply of the processing liquid from the nozzle 42 is stopped. The film thickness distribution on the front surface of the workpiece W can be adjusted by adjusting the closing timing together with other control parameters of the liquid processing unit U1.

Meanwhile, in a case in which the closing timing of the opening/closing valve 46 is adopted as the control parameter, changing the closing timing means that the amount of processing liquid supplied to the workpiece W can be changed. This may affect the film thickness of the entire processed film AF on the workpiece W. Therefore, when the closing timing is changed under the condition that the supply amount of the processing liquid is not changed, it is necessary to adjust the amount of processing liquid supplied from the processing liquid supplier 40 so that a predetermined amount of the processing liquid is supplied to the workpiece W when the opening/closing valve 46 is closed at the changed closing timing. Specifically, it is necessary to adjust the injection amount of the processing liquid by adjusting the pumping amount of the pump 45 and consequently adjusting the injection pressure of the processing liquid injected from the nozzle 42. In addition, when acquiring the parameter sensitivity, it is necessary to calculate the parameter sensitivity after adjusting the injection amount of the processing liquid, which may be changed depending on the closing timing.

Hereinafter, as a modification, a method of adjusting the injection amount of the processing liquid from the processing liquid supplier 40 according to the change in the closing timing of the opening/closing valve 46 will be described. The process related to the injection amount adjustment may be performed by the module correction value calculator 107 of the control device 100. Specifically, the injection pressure of the processing liquid injected from the processing liquid supplier 40 (i.e., the pumping amount of the pump 45) may be defined so that when the correction value for the closing timing of the opening/closing valve 46 is calculated in the module correction value calculator 107, the injection amount is not changed correspondingly.

Figure 15:
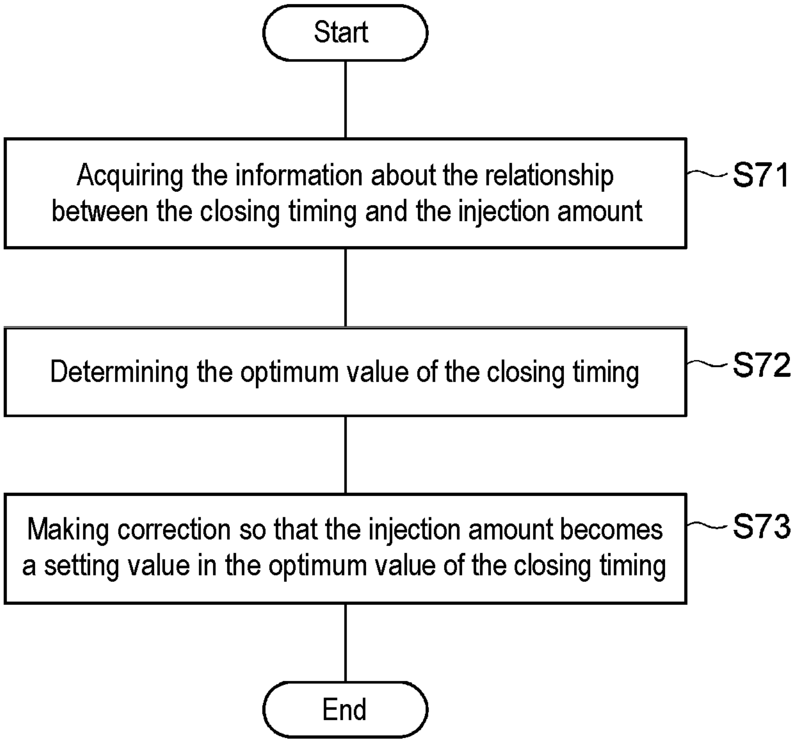
FIG. 15 is a flowchart showing an example of a method of adjusting the injection pressure of a processing liquid according to the closing timing of a valve.
Figure 16A:
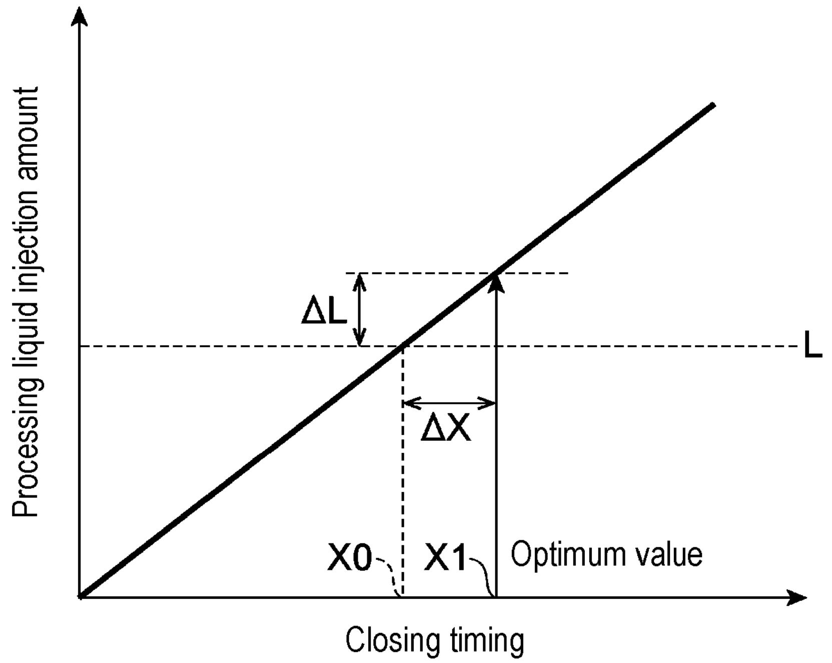
FIGS. 16A and 16B are diagrams for explaining the example of the method of adjusting the injection pressure of the processing liquid according to the closing timing of the valve.

FIG. 15 is a diagram showing a specific procedure for adjusting the injection amount of the processing liquid. First, the control device 100 executes step S71. In step S71, the control device 100 acquires the relationship between the closing timing of the opening/closing valve 46 and the injection amount of the processing liquid injected from the processing liquid supplier 40. At the stage when the adjustment setting value is acquired from the user, the pumping amount of the pump 45 in the processing liquid supplier 40 is defined in advance. Therefore, in step S71, as shown in FIG. 16A, information relating to the relationship between the closing timing and the processing liquid injection amount is acquired. In this case, it is assumed that the closing timing and the processing liquid injection amount are in a proportional relationship. Therefore, it is possible to determine a closing timing X0 for realizing a target value L of the supply amount of the processing liquid to the workpiece W.

Next, the control device 100 executes step S72. In step S72, the control device 100 calculates the optimum value of the close timing. As shown in the above-described embodiment, the optimum value is calculated by the procedure of calculating the correction value of the control parameter for each module after calculating the parameter sensitivity. The correction value of the close timing in a specific module is calculated by using the closing timing as one type of control parameter, and the optimum value is obtained by reflecting this correction value.

Next, the control device 100 executes step S73. In step S73, the control device 100 changes the pumping amount of the pump 45 so that the amount of supply of the processing liquid becomes a setting amount, when the processing liquid supplier 40 is operated with the close timing kept at the optimum value. The pumping amount of the pump 45 is initially set so that a predetermined amount of processing liquid is supplied to the workpiece W under the condition that the closing timing is not corrected. On the other hand, the supply time of the processing liquid supplied to the workpiece W is changed by adjusting the closing timing. Therefore, it is required to adjust the amount of processing liquid supplied per unit time by adjusting the pumping amount.

Specifically, as shown in FIG. 16A, it is assumed that the optimum value X1 of the close timing is shifted by Δx from the initial value of the close timing X0. In this case, the injection amount of the processing liquid increases by the increment of the injection time of the processing liquid, and actually increases by ΔL. This relationship will be explained using the relationship between the injection pressure of the processing liquid and the injection amount of the processing liquid shown in FIG. 16B. When the close timing is set as X0, the injection pressure and the injection amount of the processing liquid have the relationship indicated by the calibration curve $C_{X0}$. At this time, when the injection pressure is set to an initial value D0, the processing liquid corresponding to a target value L is supplied to the workpiece W.

Meanwhile, when the close timing is set to X1, the processing liquid supply amount increases by ΔL. Therefore, the calibration curve indicating the injection pressure and the injection amount of the processing liquid may be changed from the calibration curve $C_{X0}$ to the calibration curve $C_{X1}$ passing through the point C0 which indicates the injection pressure D0 and the increased processing liquid supply amount. By specifying this calibration curve $C_{X1}$, it is possible to specify the injection pressure D1 for supplying the processing liquid corresponding to the target value L on the calibration curve $C_{X1}$. Therefore, in order to specify the injection pressure D1 for supplying the processing liquid corresponding to the target value L, it is necessary to specify the calibration curve $C_{X1}$ from the relationship between the calibration curve $C_{X0}$ and the point C0. Therefore, four methods for setting the calibration curve $C_{X1}$ will be described below.

Figure 16B:
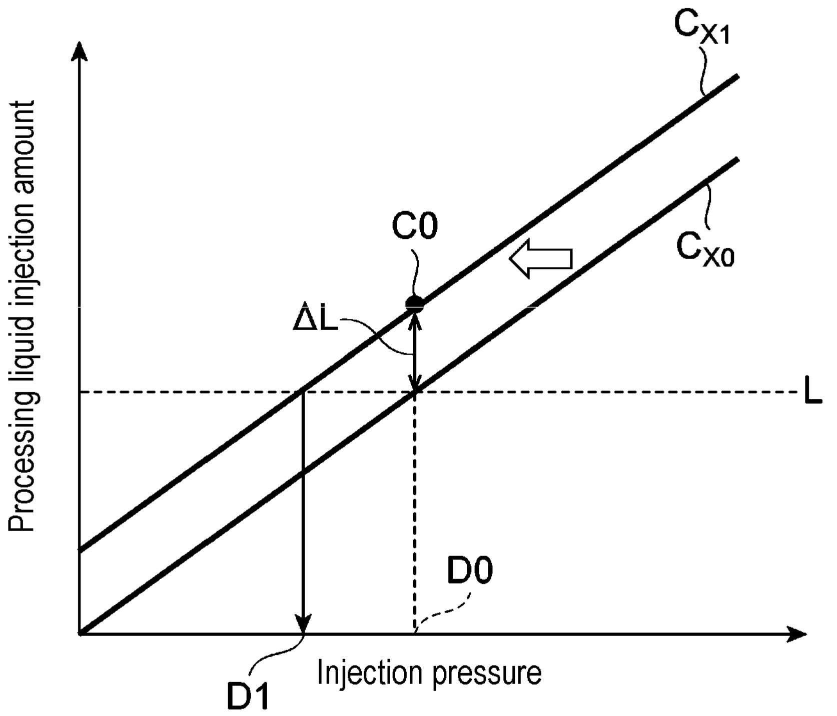

First, as a first method, there is a method of parallelly moving the calibration curve $C_{X0}$ as it is. FIG. 16B shows an example of this parallel movement. The calibration curve $C_{X1}$ has the same slope as the calibration curve $C_{X0}$, and is parallelly moved so as to pass through the point C0. After setting the calibration curve $C_{X1}$ in this way, the injection pressure D1 corresponding to the optimum value of the closing timing can be obtained from the intersection of the calibration curve $C_{X1}$ and the target value L.

Figure 17A:
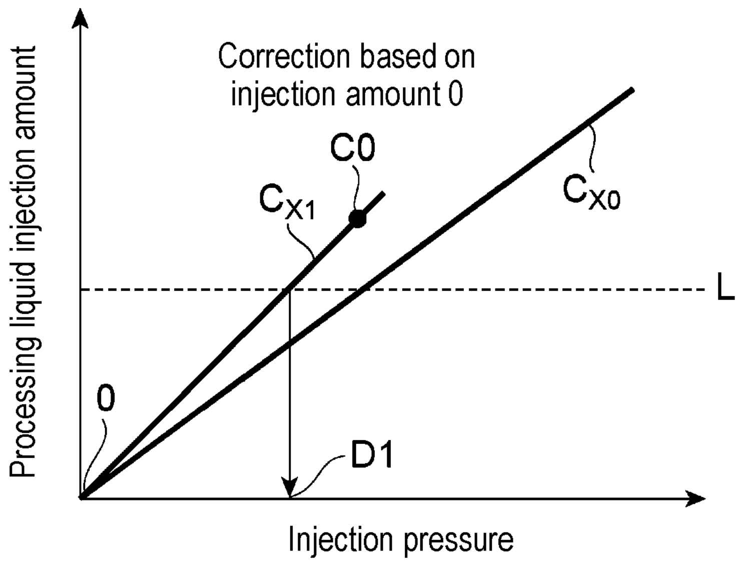
FIGS. 17A to 17C are diagrams for explaining the example of the method of adjusting the injection pressure of the processing liquid according to the closing timing of the valve.

The second to fourth methods are all based on the assumption that the slope of the calibration curve is changed as the closing timing is changed. First, as a second method, there is a method of adjusting the slope on the premise that the condition of the calibration curve $C_{X0}$ and the injection pressure when the injection amount becomes 0 are the same. FIG. 17A shows this example. The calibration curve $C_{X1}$ is set so as to pass through the point where the calibration curve $C_{X0}$ has an injection amount of 0 and the point C0 when the closing timing is changed. After setting the calibration curve $C_{X1}$ in this manner, the injection pressure D1 corresponding to the optimum value of the closing timing is obtained from the intersection of the calibration curve $C_{X1}$ and the target value L.

Figure 17B:
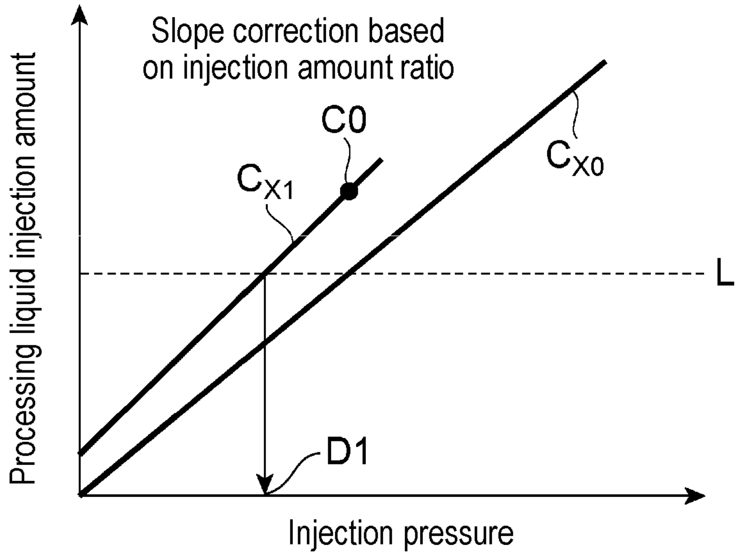

A third method is a method of adjusting the slope of the calibration curve using the injection amount ratio, because the injection amount is changed by the change of the closing timing. FIG. 17B shows this example. The slope of the calibration curve $C_{X1}$ is obtained by multiplying S by (injection amount after the change of the closing timing/injection amount before the change of the closing timing), where S is the slope of the calibration curve $C_{X0}$. Since (injection amount after the change of the closing timing/injection amount before the change of the closing timing) is obtained from (L+ΔL)/L, S×(L+ΔL)/L is the slope of the calibration curve $C_{X1}$. After setting the calibration curve Cx1 in this manner, the injection pressure D1 corresponding to the optimum value of the closing timing is obtained from the intersection of the calibration curve $C_{X1}$ and the target value L.

Figure 17C:
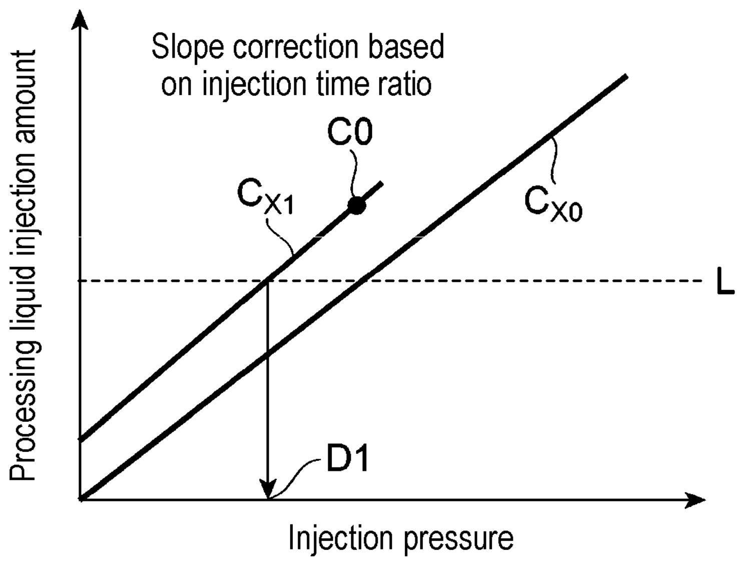

The fourth method is a method of adjusting the slope of the calibration curve using the injection time, because the injection time is changed by the change of the closing timing. FIG. 17C shows this example. The slope of the calibration curve $C_{X1}$ is obtained by multiplying S by (injection time after the change of the closing timing/injection time before the change of the closing timing), where S is the slope of the calibration curve $C_{X0}$. Assuming that the injection time of the processing liquid when the closing timing is the initial value X0 is T0, (injection time after the change of the closing timing/injection time before the change of the closing timing) can be obtained as (T0+(X1−X0))/T0. Therefore, S×(T0+(X1−X0))/T0 is the slope of the calibration curve $C_{X1}$. After setting the calibration curve $C_{X1}$ in this manner, the injection pressure D1 corresponding to the optimum value of the closing timing is obtained from the intersection of the calibration curve $C_{X1}$ and the target value L.

As described above, various modifications may be made to the method of setting the calibration curve $C_{X1}$ for calculating the injection pressure D1 corresponding to the optimum value of the close timing. Which of these methods should be adopted may be determined, for example, in consideration of the characteristics of the processing liquid supplier 40 and the like. Regardless of which method is adopted, the accuracy of the adjustment of the calibration curve is sufficiently high. Therefore, the injection amount of the processing liquid can be adjusted with high accuracy regardless of which method is adopted. However, the fourth method among the above-described four methods can obtain the calibration curve while reducing the influence of variations in the actual injection amount of the processing liquid and, therefore, can correct the injection amount of the processing liquid more accurately and precisely.

The above-described methods of adjusting the injection amount of the processing liquid supplied from the processing liquid supplier 40 are based on the premise that the calibration curve $C_{X0}$ is prepared in advance. However, the present disclosure is not limited thereto. That is, an adjustment method that does not use the calibration curve $C_{X0}$ may also be adopted.

For example, the control device 100 stores an experimentally obtained minimum injection pressure at which the injection amount of the processing liquid becomes 0 or more, and also acquires one combination of the injection pressure and the injection pressure of the processing liquid when the processing liquid supplier 40 is actually operated. By using these two combined numerical values, it is possible to obtain a characteristic line approximating the calibration curve $C_{X0}$ and use the characteristic straight line in place of the calibration curve $C_{X0}$. When using a common pump for the respective modules, the relative heights between the pump and the nozzles of the respective modules and the lengths of pipes are different. Therefore, by storing the minimum injection pressure for each module, it is possible to obtain a characteristic straight line that better matches the characteristics of the module.

If one combination value when operating the processing liquid supplier 40 is acquired at the time of installation of the processing liquid (at the time of introducing the processing liquid into the apparatus), it can be used in a feedforward manner at the time of actual injection for the adjustment work of the injection amount. Alternatively, a combination value may be acquired during actual injection for the adjustment work of the injection amount, and the pressure may be set in a feedback manner during the next actual injection.

A complicated work such as measuring the injection amount of the processing liquid with an electronic balance or the like is required to actually obtain the calibration curve $C_{X0}$ used in the first to fourth methods described above. On the other hand, if the method using the characteristic straight line is adopted, it is not necessary to perform the work for obtaining the calibration curve $C_{X0}$. This makes it possible to adjust the injection amount of the processing liquid in an easier manner.

[Operation]

According to the coating developing apparatus 2 and the control parameter setting method described above, the film thickness value of the processed film on the substrate after film formation by the first film forming module is acquired based on the first parameter group, and the film thickness value of the processed film on the substrate after film formation by the second film forming module is acquired based on the second parameter group. The first parameter group and the second parameter group are updated so that the difference between the acquired film thickness values becomes small. Therefore, the difference in film thickness between the films formed on the substrates in different modules is reduced.

In the related arts, in order to adjust the film thickness of a processed film formed on a substrate processed by the film forming modules of the same type, it has been considered to correct the control parameters in each module. However, it has not been considered that the film thickness values of the substrates after the actual film processing in the respective modules are measured and the first parameter group and the second parameter group are updated so that the difference between the measurement results becomes small. In the above-described configuration, adjustments are made to reduce the film thickness value based on the measurement results in the respective modules. Therefore, by finely adjusting the control parameters, it is possible to further reduce the difference in film thickness value.

In addition, by acquiring the film thickness values of the processed films on the substrates on which the films are formed using the updated first parameter group and second parameter group, it is possible to verify whether the difference in film thickness value is reduced using the updated first parameter group and second parameter group. Therefore, if the difference in film thickness value is not small, it is possible to take measures such as updating the first parameter group and the second parameter group again as described above. Accordingly, the difference in film thickness between the films formed on the substrates in different modules is further reduced.

When the film forming module includes the processing liquid supplier 40, the injection state of the processing liquid supplied from the processing liquid supplier 40 may affect the film thickness value. Therefore, by using the parameter for adjusting the injection state of the processing liquid as the control parameter as described above, it is possible to make the adjustment so as to reduce the difference in film thickness value.

Furthermore, if the processing liquid supplier 40 includes the opening/closing valve 46, the flow of the processing liquid through the valve may affect the film thickness value. Therefore, by using the closing timing of the valve as the parameter for adjusting the injection state of the processing liquid, it is possible to make the adjustment so as to reduce the difference in film thickness value.

However, changing the closing timing of the opening/closing valve 46 as described above affects the supply amount of the processing liquid. If the supply amount of the processing liquid is changed, the film thickness value may be changed significantly from the predetermined value. Therefore, by updating the injection pressure based on the changed closing timing so that the supply amount of the processing liquid supplied from the processing liquid supplier is constant, it is possible to suppress the film thickness fluctuation due to the change in the supply amount of the processing liquid.

Further, if the film forming module includes the rotary holder that holds and rotates the substrate, the number of rotations of the rotary holder when supplying the processing liquid (the number of rotations during injection) and the number of rotations of the rotary holder when drying the processing liquid (the number of rotations during drying) may affect the film thickness value. Specifically, the number of rotations during injection is the number of rotations when the processing liquid is spread over the front surface of the workpiece W, and the film thickness distribution may be changed depending on the balance with the injection speed of the processing liquid. On the other hand, the number of rotations during drying is the number of rotations when drying the processing liquid. If the number of rotations during drying is large, the amount of the processing liquid shaken off from the edge of the workpiece W without being dried increases, and the processing film tends to become thinner as a whole. If the number of rotations during drying is small, the processing film tends to become thicker. Thus, the number of rotations may affect the film thickness of the processed film. Therefore, by using the number of rotations of the rotary holder when supplying the processing liquid (the number of rotations during injection) or the number of rotations of the rotary holder during drying (the number of rotations during drying) as a control parameter, it is possible to make the adjustment so the difference in film thickness value becomes small. It may also be possible to use both the number of rotations of the rotary holder during supply of the processing liquid and the number of rotations of the rotary holder during drying of the processing liquid.

The film thickness value may be expressed as a film thickness profile consisting of multiple components related to the shape of the film thickness distribution. Further, the sensitivity of the multiple control parameters related to the film thickness value may be determined based on the relationship with each component included in the film thickness profile. Furthermore, when updating the control parameters, the sensitivity of the multiple control parameters related to the film thickness value may be used. By expressing the film thickness value as the film thickness profile consisting of the multiple components related to the shape of the film thickness distribution in this way, it is possible to specify what elements related to the film thickness distribution are included in the film thickness value. In addition, by calculating the degree to which each control parameter included in the parameter group contributes to the variation of the film thickness value as the sensitivity to the film thickness value, it is possible to accurately update the control parameters so that the difference in film thickness value becomes small.

Information about the sensitivity of the multiple control parameters related to the film thickness value may be transferred to another substrate processing apparatus other than the substrate processing apparatus. In this case, it is possible to use the information about the sensitivity of the film thickness values of the multiple control parameters in multiple substrate processing apparatuses, thereby improving the convenience.

The method may further include acquiring an offset amount of the film thickness value when acquiring the film thickness value of the processed film. As described above, the measurement part (spectroscopic measurement part 60) that measures the film thickness may include an offset component derived from the apparatus configuration or the like. Thus, by adopting the configuration that acquires the offset amount, it is possible to obtain the film thickness measurement taking the offset into account. Therefore, by using this information, it is possible to make finer adjustment to reduce the difference in film thickness value.

The method may further include updating the first parameter group and the second parameter group with respect to multiple types of film forming processes, and the execution of the film forming process combining the updated control parameters, which are related to the multiple types of film forming processes and obtained for the same film forming module, may be instructed. In this case, when performing the same type of film forming process in the same film forming module, the process using the updated control parameters can be performed without performing the process for updating the control parameters again. Therefore, the convenience of film formation is improved.

Modification

While various exemplary embodiments have been described above, various omissions, substitutions, and modifications may be made without being limited to the exemplary embodiments described above. In addition, elements of different embodiments can be combined to form other embodiments.

For example, the method of measuring the film thickness of the processed film AF on the workpiece W is not limited to the method described in the above embodiment. In the above embodiment, the film thickness is measured by irradiating the laser beam. However, the film thickness analysis method described in the above embodiment may be applied as long as it can obtain the measured value (estimated value) of the film thickness of the processed film AF formed on the workpiece W. Therefore, it is only necessary to acquire film thickness information at multiple measurement points on the workpiece W using a known film thickness measurement method or the like. The method is not particularly limited.

Even when the film thickness measurement method described in the above embodiment is used, the arrangement, configuration, etc. of each part may be changed as appropriate.

Further, in the above example, the thickness of the processed film AF of the processing liquid (resist) for forming the resist film is estimated. In contrast, the film thickness analysis method described in the above embodiment may estimate the thickness of the coated film of the processing liquid for forming a film other than a resist film (e.g., a lower layer film or an upper layer film). In addition, the present disclosure may be applied to a developing solution for developing a resist film.

Further, the configuration of the corresponding film forming module may be changed according to the type of target film. Moreover, even if the target film is the same, the film forming module whose control parameters are to be adjusted can be changed. The configurations described in the above embodiment can be applied regardless of the type of target film forming module. In addition, the configurations described in the above embodiment can be applied even when there are multiple types of film forming modules, such as the liquid processing unit U1 and the heat treatment unit U2 described above.

From the foregoing description, it will be appreciated that various embodiments of the present disclosure have been set forth herein for purposes of description, and that various changes may be made without departing from the scope and spirit of the present disclosure. Therefore, the various embodiments disclosed herein are not intended to be limiting, and the true scope and spirit are defined by the following claims.

According to the present disclosure in some embodiments, it is possible to reduce the difference in film thickness between films formed on substrates in different modules.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control parameter setting method for setting control parameters of film forming modules included in a substrate processing apparatus, comprising:

acquiring a first parameter group which is a control parameter group including control parameters set in a first film forming module for performing a first film formation, and a second parameter group which is a control parameter group including control parameters set in a second film forming module for performing a second film formation;

measuring a film thickness value of a processed film on a substrate, which is subjected to the first film formation by the first film forming module based on the first parameter group, and a film thickness value of a processed film on a substrate, which is subjected to the second film formation by the second film forming module based on the second parameter group; and updating the first parameter group and the second parameter group so that a difference between the film thickness value on the substrate measured in the first film forming module and the film thickness value on the substrate measured in the second film forming module is reduced, wherein the film thickness value is expressed as a film thickness profile including components related to a film thickness distribution shape, wherein the control parameter setting method further comprises determining a sensitivity of the control parameters included in the first parameter group and the second parameter group related to the film thickness value based on a relationship with each of the components included in the film thickness profile, and wherein when updating the first parameter group and the second parameter group, each of the control parameters included in the first parameter group and the second parameter group is updated by using the sensitivity of the control parameters related to the film thickness value.

2. The control parameter setting method of claim 1, further comprising:

measuring the film thickness value of the processed film on the substrate, which is subjected to the first film formation by the first film forming module based on the updated first parameter group, and the film thickness value of the processed film on the substrate, which is subjected to the second film formation by the second film forming module based on the updated second parameter group.

3. The control parameter setting method of claim 1, wherein each of the film forming modules includes a rotary holder configured to hold and rotate the substrate and a processing liquid supplier configured to supply a processing liquid to the rotated substrate, and wherein the first parameter group and the second parameter group include at least a parameter for adjusting an injection state from the processing liquid supplier.

4. The control parameter setting method of claim 3, wherein the processing liquid supplier includes a valve configured to control a flow of the processing liquid in a processing liquid flow path by opening/closing operations of the valve, and wherein the parameter for adjusting the injection state is a closing timing of the valve.

5. The control parameter setting method of claim 4, wherein the processing liquid supplier is further configured to change an injection pressure of the processing liquid, and is further configured to update the injection pressure, when the closing timing of the valve included in the first parameter group or the second parameter group is updated, based on the updated closing timing so that the amount of the processing liquid supplied from the processing liquid supplier becomes constant.

6. The control parameter setting method of claim 3, wherein the control parameter group includes one of the number of rotations of the rotary holder when supplying the processing liquid and the number of rotations of the rotary holder when drying the supplied processing liquid.

7. The control parameter setting method of claim 1, further comprising:

transferring information about the sensitivity of the control parameters related to the film thickness value to another substrate processing apparatus different from the substrate processing apparatus.

8. The control parameter setting method of claim 1, further comprising:

acquiring an offset amount of the film thickness value when measuring the film thickness value of the processed film in one of the first film forming module and the second film forming module.

9. The control parameter setting method of claim 1, further comprising:

updating the first parameter group and the second parameter group with respect to multiple types of film forming processes; and instructing execution of a film forming process that combines the updated control parameters related to the multiple types of film forming processes obtained for one of the first film forming module and the second film forming module.

10. A substrate processing apparatus comprising:

a controller configured to control a first film forming module and a second film forming module that perform a film forming process on a substrate, wherein the controller includes:

a parameter acquisitor configured to acquire a first parameter group which is a control parameter group including control parameters set in the first film forming module for a first film formation, and a second parameter group which is a control parameter group including control parameters set in the second film forming module for a second film formation;

a film thickness information acquisitor configured to measure a film thickness value of a processed film on a substrate, which is subjected to the first film formation by the first film forming module based on the first parameter group, and measure a film thickness value of a processed film on a substrate, which is subjected to the second film formation by the second film forming module based on the second parameter group; and a parameter updater configured to update the first parameter group and the second parameter group so that a difference between the film thickness value on the substrate measured in the first film forming module and the film thickness value on the substrate measured in the second film forming module is reduced, wherein the film thickness value is expressed as a film thickness profile including components related to a film thickness distribution shape, wherein the controller further includes a parameter sensitivity calculator configured to determine a sensitivity of the control parameters included in the first parameter group and the second parameter group related to the film thickness value based on a relationship with each of the components included in the film thickness profile, and wherein the parameter updater is further configured to update each of the control parameters included in the first parameter group and the second parameter group by using the sensitivity of the control parameters related to the film thickness value.

11. The substrate processing apparatus of claim 10, wherein the film thickness information acquisitor is further configured to measure the film thickness value of the processed film on the substrate subjected to the first film formation by the first film forming module based on the updated first parameter group and the film thickness value of the processed film on the substrate subjected to the second film formation by the second film forming module based on the updated second parameter group.

12. The substrate processing apparatus of claim 10, wherein each of the film forming modules includes a rotary holder configured to hold and rotate the substrate and a processing liquid supplier configured to supply a processing liquid to the rotated substrate, and wherein the first parameter group and the second parameter group include at least a parameter for adjusting an injection state from the processing liquid supplier.

13. The substrate processing apparatus of claim 12, wherein the processing liquid supplier includes a valve configured to control a flow of the processing liquid in a processing liquid flow path by opening/closing operations of the valve, and wherein the parameter for adjusting the injection state is a closing timing of the valve.

14. The substrate processing apparatus of claim 13, wherein the processing liquid supplier is further configured to change an injection pressure of the processing liquid, and is further configured to update the injection pressure, when the closing timing of the valve included in the first parameter group or the second parameter group is updated, based on the updated closing timing so that the amount of the processing liquid supplied from the processing liquid supplier becomes constant.

15. The substrate processing apparatus of claim 12, wherein the control parameter group includes one of the number of rotations of the rotary holder when supplying the processing liquid and the number of rotations of the rotary holder when drying the supplied processing liquid.

16. The substrate processing apparatus of claim 10, wherein the controller further includes an offset amount acquisitor configured to acquire an offset amount of the film thickness value when measuring the film thickness value of the processed film in one of the first film forming module and the second film forming module.

17. The substrate processing apparatus of claim 10, wherein the controller is configured to allow the parameter updater to update the first parameter group and the second parameter group with respect to multiple types of film forming processes, and further includes an instructor configured to instruct execution of a film forming process that combines the updated control parameters related to the multiple types of film forming processes obtained for one of the first film forming module and the second film forming module.

18. A non-transitory computer-readable storage medium storing a program that causes an apparatus to perform the control parameter setting method of claim 1.

* * * * *